US009799897B2

(12) United States Patent
Nakaji et al.

(10) Patent No.: US 9,799,897 B2
(45) Date of Patent: Oct. 24, 2017

(54) FUEL CELL

(71) Applicant: TOYOTA JIDOSHA KABUSHIKI KAISHA, Toyota-shi, Aichi-ken (JP)

(72) Inventors: Hiroya Nakaji, Toyota (JP); Naohiro Takeshita, Toyota (JP); Hideki Kubo, Seto (JP); Takashi Kondo, Nagoya (JP); Seiji Mizuno, Nagoya (JP); Norishige Konno, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 167 days.

(21) Appl. No.: 14/939,061

(22) Filed: Nov. 12, 2015

(65) Prior Publication Data

US 2016/0141639 A1    May 19, 2016

(30) Foreign Application Priority Data

Nov. 14, 2014  (JP) .................................. 2014-231398

(51) Int. Cl.
*H01M 8/02* (2016.01)
*H01M 8/0263* (2016.01)
(Continued)

(52) U.S. Cl.
CPC ..... *H01M 8/0263* (2013.01); *H01M 8/04291* (2013.01); *H01M 8/242* (2013.01); *H01M 2008/1095* (2013.01)

(58) Field of Classification Search
CPC ............ H01M 8/02; H01M 8/04; H01M 8/10; H01M 8/242; H01M 8/0263; H01M 8/04291; H01M 2008/1095
See application file for complete search history.

(56) References Cited

U.S. PATENT DOCUMENTS

2004/0038102 A1* 2/2004 Beckmann .............. C25B 9/206
429/457
2007/0099061 A1* 5/2007 Na ...................... H01M 8/0265
429/410
(Continued)

FOREIGN PATENT DOCUMENTS

JP    2007-48486    2/2007
JP    2009-26472    2/2009
(Continued)

OTHER PUBLICATIONS

The Decision to Grant a Patent for Application No. 2014-231398 issued by JPO on Jan. 23, 2017.*

*Primary Examiner* — Alex Usyatinsky
(74) *Attorney, Agent, or Firm* — Finnegan, Henderson, Farabow, Garrett & Dunner, LLP

(57) ABSTRACT

In a fuel cell, a cathode passage extends from an oxidizing gas supply hole to an oxidizing gas discharge hole. A turn interval at which a flow direction of an oxidizing gas returns to an original direction in an upstream-side passage region is different from the turn interval in a downstream-side passage region. A ratio between the turn interval in the upstream-side passage region and the turn interval in the downstream-side passage region is set to 1.1:1 to 3:1. The upstream-side passage region is overlapped with a most downstream-side passage portion of an anode passage with a membrane electrode assembly interposed between the upstream-side passage region and the most downstream-side passage portion.

4 Claims, 16 Drawing Sheets

(51) Int. Cl.
*H01M 8/242* (2016.01)
*H01M 8/04291* (2016.01)
*H01M 8/1018* (2016.01)

(56) References Cited

U.S. PATENT DOCUMENTS

| | | | | |
|---|---|---|---|---|
| 2007/0117004 A1* | 5/2007 | Kikuchi | .............. | H01M 8/0258 |
| | | | | 429/434 |
| 2009/0155665 A1* | 6/2009 | Hashimoto | ......... | H01M 8/0232 |
| | | | | 429/437 |
| 2010/0285395 A1 | 11/2010 | Hayashi et al. | | |
| 2011/0183238 A1* | 7/2011 | Kimura | ............... | H01M 8/0243 |
| | | | | 429/529 |
| 2014/0162175 A1 | 6/2014 | Maeda et al. | | |

FOREIGN PATENT DOCUMENTS

| | | |
|---|---|---|
| JP | 2009-26476 | 2/2009 |
| JP | 2010-170984 | 8/2010 |
| JP | 2012-226981 | 11/2012 |

* cited by examiner

FUEL CELL

INCORPORATION BY REFERENCE

The disclosure of Japanese Patent Application No. 2014-231398 filed on Nov. 14, 2014 including the specification, drawings and abstract is incorporated herein by reference in its entirety.

BACKGROUND OF THE INVENTION

1. Field of the Invention

The invention relates to a fuel cell.

2. Description of Related Art

A fuel cell includes a membrane electrode assembly (hereinafter referred to as an MEA) in which electrodes are joined to membrane surfaces of an electrolyte membrane, an anode passage, and a cathode passage, and receives supply of a fuel gas and an oxidizing gas supplied from the passages to generate electric power. In recent years, an expanded metal, which is formed by performing press-molding on a thin metal plate, is used frequently. In the expanded metal, an expanded passage in the shape of a mesh is provided so as to intersect with the direction of flow of a gas that flows from a gas supply side to a gas discharge side, and the expanded passage connects the gas supply side and the gas discharge side while winding. When the gas passes through the mesh-shaped passage, a pressure loss occurs when the gas passes through a bent portion of the passage, and the pressure loss tends to cause a reduction in the power generation performance of the fuel cell. To cope with this, a method for suppressing the pressure loss on the gas supply side is proposed.

In Japanese Patent Application Publication No. 2009-26472 (JP 2009-26472 A), in a fuel battery that includes the expanded metal, the expanded metal is formed such that the pressure loss of the gas on the gas downstream side is increased to be larger than the pressure loss of the gas on the gas upstream side, and unevenness in the amount of gas supplied to a power generating element is reduced without excessively increasing the pressure loss of the gas in the entire expanded metal. In addition, in Japanese Patent Application Publication No. 2010-170984 (JP 2010-170984 A), in the fuel battery in which a gas passage is formed of the expanded metal of the fuel battery, the gas passage is formed such that the gas flows without repeating a small turn, and the pressure loss of the gas is thereby reduced. At a turn position of a flow direction of the gas, the flow direction of the gas having arrived at the turn position changes, and hence the gas is locally directed to an electrode surface of the MEA or directed to a side away from the (electrode surface. As a result, at the turn position, the evaporation of water from the MEA or the penetration of water into the MEA occurs, the deterioration of humidity of the MEA may occur when the water evaporation is excessive, and flooding of the MEA may occur when the water penetration is excessive. However, in JP 2009-26472 A and JP 2010-170984 A mentioned above, these points are not considered. In addition, in the case where the expanded passage is the passage on a cathode side, an anode passage that supplies a hydrogen gas is present on an anode side across the MEA, but this relationship with the anode passage is not considered in JP 2009-26472 A and JP 2010-170984 A mentioned above. Thus, it is desired to suppress both of the pressure loss of the gas on the gas supply side and the flooding.

SUMMARY OF THE INVENTION

The invention provides the fuel cell in which pressure loss on an oxidizing gas supply side and flooding are suppressed.

An aspect of the invention provides a fuel cell. The fuel cell includes a membrane electrode assembly including an electrolyte membrane and electrodes joined to membrane surfaces of the electrolyte membrane; an anode-side passage formation portion having a fuel gas supply hole and a fuel gas discharge hole and forming an anode passage that supplies a fuel gas to one of the electrodes of the membrane electrode assembly, as a serpentine passage in which a flow direction of the fuel gas is reversed a plurality of times, the anode passage extending from the fuel gas supply hole to the fuel gas discharge hole; and a cathode-side passage formation portion having an oxidizing gas supply hole and an oxidizing gas discharge hole and forming a cathode passage that diffuses an oxidizing gas and supplies the oxidizing gas to another electrode of the membrane electrode assembly, as a mesh-shaped passage, the cathode passage extending from the oxidizing gas supply hole to the oxidizing gas discharge hole. The cathode-side passage formation portion includes a plurality of passage forming element rows that are consecutively provided from the oxidizing gas supply hole to the oxidizing gas discharge hole along a first direction extending from the oxidizing gas supply hole to the oxidizing gas discharge hole; each of the passage forming element rows is formed by consecutively providing a plurality of passage forming elements along a second direction intersecting with the first direction; the plurality of passage forming element rows are consecutively provided such that a flow direction of the oxidizing gas flowing in the cathode passage serving as the mesh-shaped passage extends in a first inclination direction and a second inclination direction in every predetermined number of the passage forming element rows, the predetermined number being an integer of 2 or more; the first inclination direction is inclined to one side relative to the first direction, the second inclination direction is inclined to another side relative to the first direction, and the first inclination direction and the second inclination direction are symmetrical with respect to the first direction; a turn interval at which the flow direction of the oxidizing gas returns to an original direction in an upstream-side passage region on a side of the oxidizing gas supply hole is made different from the turn interval in a downstream-side passage region on a side of the oxidizing gas discharge hole by making the predetermined number in the upstream-side passage region different from the predetermined number in the downstream-side passage region; a ratio between the turn interval in the upstream-side passage region and the turn interval in the downstream-side passage region is set to 1.1:1 to 3:1; and the upstream-side passage region is overlapped with a most downstream-side passage portion of the anode passage serving as the serpentine passage formed by the anode-side passage formation portion with the membrane electrode assembly interposed between the upstream-side passage region and the most downstream-side passage portion.

In the fuel cell having the above configuration, in the mesh cathode passage for supplying the oxidizing gas, the turn interval at which the flow direction of the oxidizing gas returns to the original direction in each of the upstream-side passage region and the downstream-side passage region is set such that the turn interval $Tu$ in the upstream-side passage region is larger than the turn interval $Td$ in the downstream-side passage region. With this configuration, in the upstream-side passage region as the oxidizing gas supply side, it is possible to reduce the number of turn positions at which the flow direction of the oxidizing gas changes, and thus, it is possible to suppress the pressure loss of the gas. In addition to this, in the fuel cell having the above-described configuration, by setting the ratio $Tu:Td$ between the turn interval Tu in the upstream-side passage region and the turn interval Td in the downstream-side passage region to 1.1:1 to 3:1, the number of the turn positions in the upstream-side passage region is not excessively reduced as compared with the number of the turn positions in the downstream-side passage region or the number of the turn positions in the downstream-side passage region is not excessively increased as compared with the number of the turn positions in the upstream-side passage region, and the turn positions are provided in the upstream-side passage region and the downstream-side passage region in a well-balanced manner. With this configuration, it is possible to suppress the penetration of water into the membrane electrode assembly that tends to occur in the downstream-side passage region in which many turn positions are provided. As a result, in the fuel cell having the above-described configuration, it is possible to suppress both of the pressure loss of the oxidizing gas in the upstream-side passage region as the oxidizing gas supply side and flooding. In addition to this, in the fuel cell having the above-described configuration, it is possible to increase the relative humidity of the most downstream-side passage portion of the anode passage serving as the serpentine passage formed by the anode-side passage formation portion in the following manner. Since the most downstream-side passage portion of the anode passage serving as the serpentine passage is overlapped with the upstream-side passage region of the cathode passage with the electrolyte membrane interposed between the most downstream-side passage portion and the upstream-side passage region, the relative humidity tends to be reduced due to removal of water by the oxidizing gas or supply of the dry oxidizing gas. However, in the fuel cell having the above-described configuration, the evaporation of water from the membrane electrode assembly is suppressed by reducing the number of the turn positions in the upstream-side passage region, and hence it is possible to send water contained in the membrane electrode assembly to the most downstream-side passage portion of the anode passage. Therefore, in the fuel cell having the above-described configuration, it is possible to increase the relative humidity of the most downstream-side passage portion of the anode passage serving as the serpentine passage.

In the fuel cell according to the above-described aspect, a passage width of the upstream-side passage region along the first direction may be equal to a passage width of the most downstream-side passage portion of the anode passage serving as the serpentine passage. With this configuration, it is possible to more reliably increase the relative humidity of the most downstream-side passage portion of the anode passage serving as the serpentine passage.

In the fuel cell according to the above-described aspect, a passage width of the upstream-side passage region along the first direction may be set to 50% or less of an entire passage width of the cathode passage along the first direction. With this configuration, it is possible to secure the upstream-side passage region in which the number of the turn positions is reduced such that the evaporation of water from the membrane electrode assembly is suppressed and the water from the membrane electrode assembly can be sent to the most downstream-side passage portion of the anode passage. Thus, it is possible to even more reliably increase the relative humidity of the most downstream-side passage portion of the anode passage serving as the serpentine passage.

In the fuel cell according to the above-described aspect, the anode passage may be formed on one of surfaces of the anode-side passage formation portion as the serpentine passage, the anode passage being formed by a groove that is opened on a side of the one of the electrodes; the anode-side passage formation portion may have a coolant supply hole and a coolant discharge hole, and may include a plurality of coolant passages in which a coolant flows from the coolant supply hole to the coolant discharge hole, the plurality of coolant passages being formed on a surface opposite to the anode passage; and the plurality of coolant passages may be formed such that a flow rate of the coolant flowing in the coolant passage that extends from the coolant supply hole to the coolant discharge hole via a back side of the most downstream-side passage portion of the anode passage serving as the serpentine passage is larger than a flow rate of the coolant flowing in the coolant passage that extends from the coolant supply hole to the coolant discharge hole via a back side of a portion upstream of the most downstream-side passage portion in the anode passage serving as the serpentine passage. With this configuration, it is possible to suppress the evaporation of water by efficiently cooling the most downstream-side passage portion that tends to be dried due to a reduction in relative humidity, and thus, it is possible to suppress dryness.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
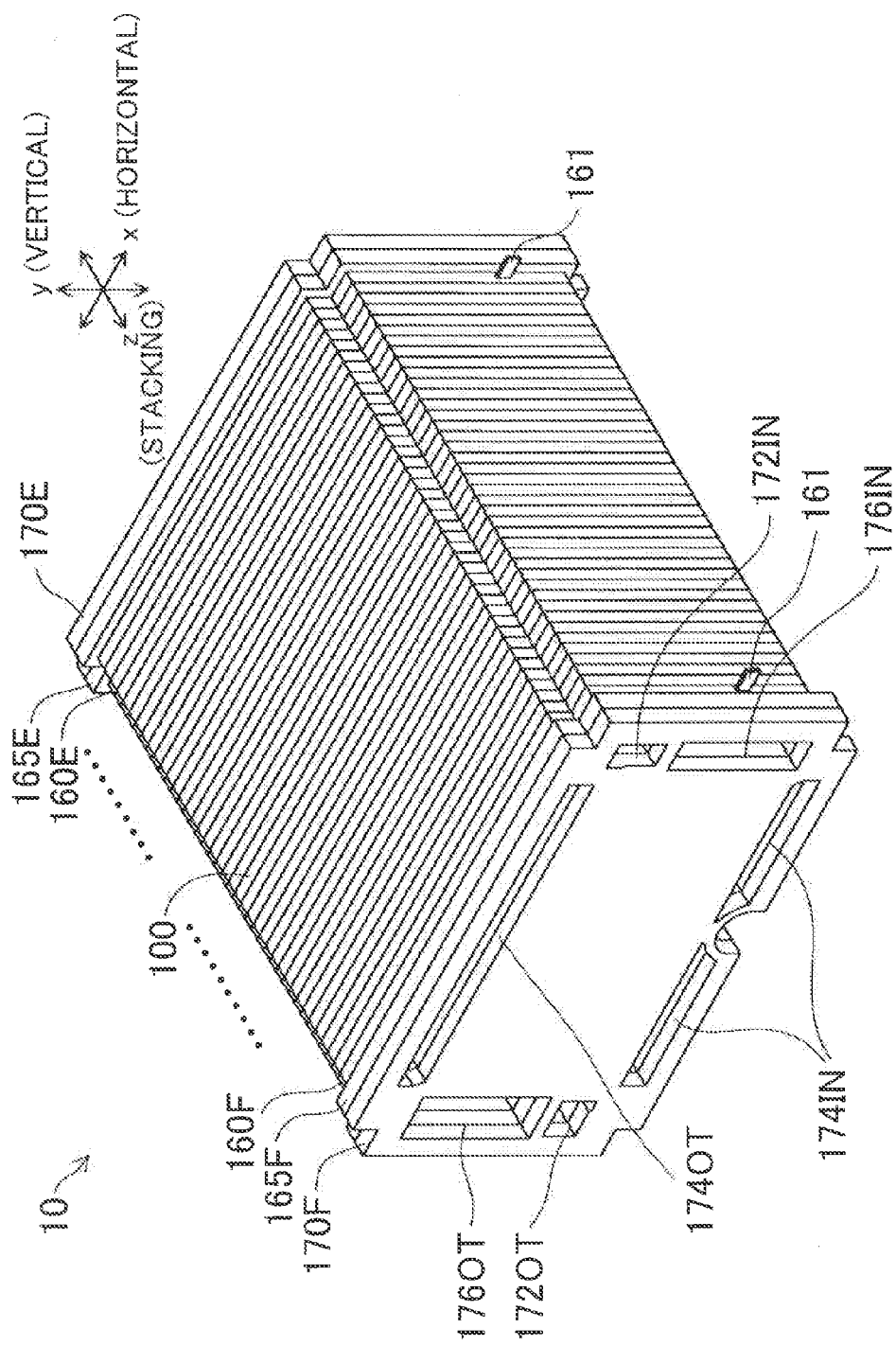
FIG. 1 is a schematic perspective view showing the configuration of a fuel battery 10 of an embodiment of the invention.

Hereinbelow, an embodiment of the invention will be described based on the drawings. FIG. 1 is a schematic perspective view showing the configuration of a fuel battery 10 of the present embodiment. The fuel battery 10 has a stack structure in which a plurality of fuel cells 100 are stacked in a Z direction (also referred to as a "stacking direction"), and are held between a pair of end plates 170F and 170E. The fuel battery 10 includes a terminal plate 160F disposed between the end plate 170F on one end side thereof and the fuel cell 100 such that an insulating plate 165F is disposed between the terminal plate 160F and the end plate 170F. Hereinbelow, one end side of the fuel battery 10 provided with the end plate 170F is referred to as a front end side for the convenience of description, and the other end side on a far side of a paper sheet in the drawing is referred to as a rear end side.

Similarly, the fuel battery 10 includes a terminal plate 160E on the rear end side disposed between the end plate 170E on the rear end side and the fuel cell 100 such that an insulating plate 165E on the rear end side is disposed between the terminal plate 160E and the end plate 170E. Each of the fuel cell 100, the terminal plates 160F and 160E, the insulating plates 165F and 165E, and the end plates 170F and 170E has a plate structure having a substantially rectangular outer shape, and is disposed such that the long side extends along an X direction (horizontal direction), and the short side extends along a Y direction (vertical direction, perpendicular direction).

Each of the end plate 170F, the insulating plate 165F, and the terminal plate 160F on the front end side has a fuel gas supply hole and a fuel gas discharge hole, an oxidizing gas supply hole and an oxidizing gas discharge hole, and a coolant supply hole and a coolant discharge hole. These supply/discharge holes communicate with the supply/discharge holes provided at corresponding positions of each fuel cell 100, and constitute corresponding supply-discharge manifolds for the gas and the coolant. On the other hand, the end plate 170E, the insulating plate 165E, and the terminal plate 160E on the rear end side are not provided with the supply/discharge holes. This is because the fuel battery of the present embodiment is a fuel battery of a type in which a reactive gas (the fuel gas, the oxidizing gas) and the coolant are supplied from the end plate 170F on the front end side to the individual fuel cells 100 via the supply manifolds, and the discharged gas and the discharged water from the individual fuel cells 100 are discharged to the outside from the end plate 170F on the front end side via the discharge manifolds. However, the fuel battery is not limited thereto, and it is possible to employ, as the fuel battery, various types of fuel batteries such as a type in which the reactive gas and the coolant are supplied from the end plate 170F on the front end side and the discharged gas and the discharged water are discharged to the outside from the end plate 170E on the rear end side.

In the end plate 170F on the front end side, oxidizing gas supply holes 174IN are disposed at an outer edge portion of a lower end of the end plate 170F on the front end side to extend along the X direction (long side direction), and an oxidizing gas discharge hole 174OT is disposed at the outer edge portion of an upper end thereof to extend along the X direction. A fuel gas supply hole 172IN is disposed at an upper end portion, in the Y direction (short side direction), of the outer edge portion of a right end of the end plate 170F on the front end side, and a fuel gas discharge hole 172OT is disposed at a lower end portion, in the Y direction, of the outer edge portion of a left end thereof. A coolant supply hole 176IN is disposed below the fuel gas supply hole 172IN to extend along the Y direction, and a coolant discharge hole 176OT is disposed above the fuel gas discharge hole 172OT to extend along the Y direction. Note that the individual supply/discharge holes described above are divided into a plurality of supply/discharge holes in the fuel cell 100, as will be described later.

Each of the terminal plate 160F on the front end side and the terminal plate 160E on the rear end side is a collector plate for generated electric power of each fuel cell 100, and outputs electric power collected from a collector terminal 161 to the outside. The terminal plate 160F on the front end side is different from the terminal plate 160E on the rear end side in the presence or absence of the supply/discharge holes, and the configuration of the terminal plate 160F is otherwise the same as that of the terminal plate 160E.

Figure 2:
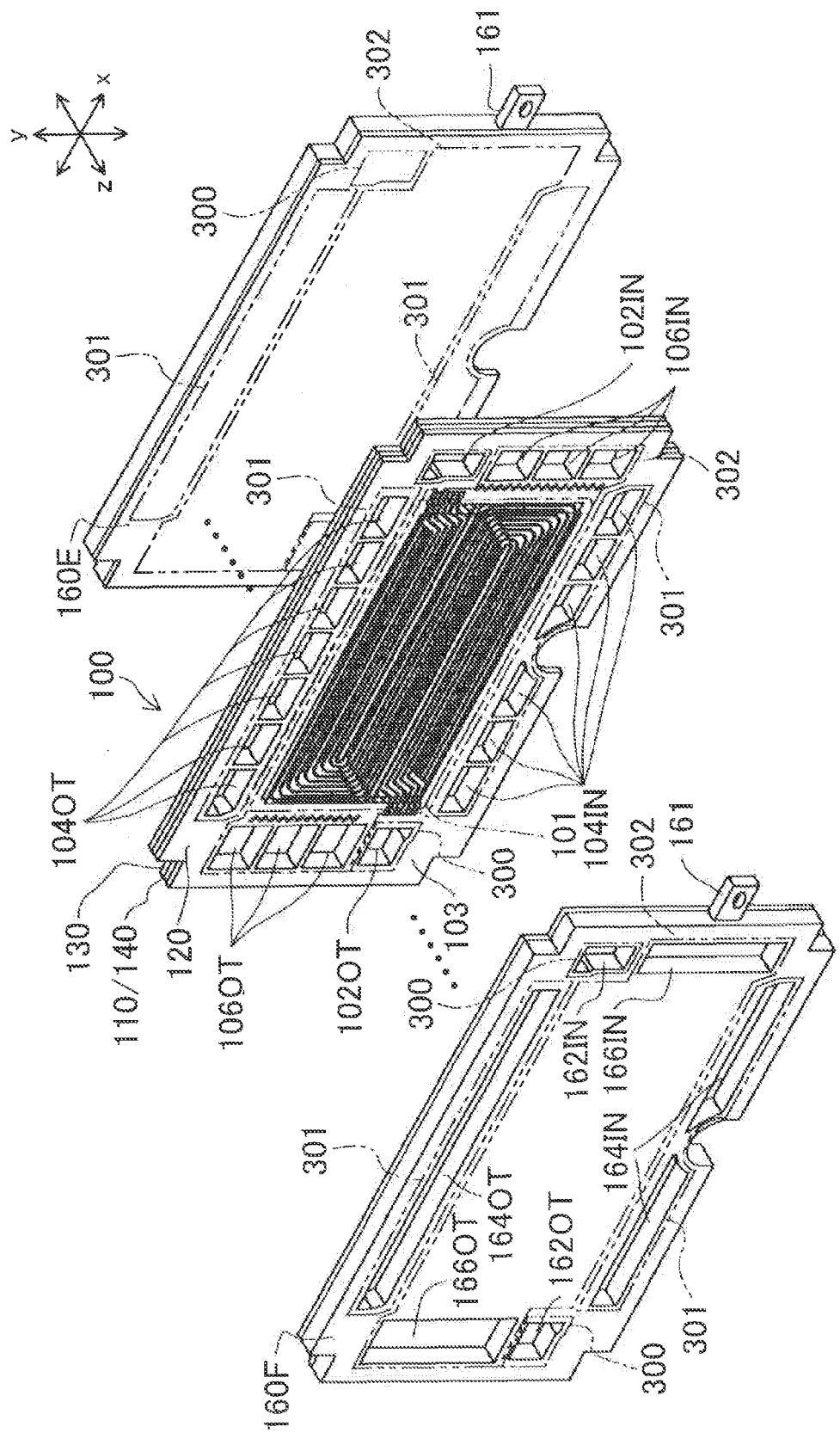
FIG. 2 is an explanatory view schematically showing the state of arrangement of a terminal plate 160F, a fuel cell 100, and a terminal plate 160E.
Figure 3:
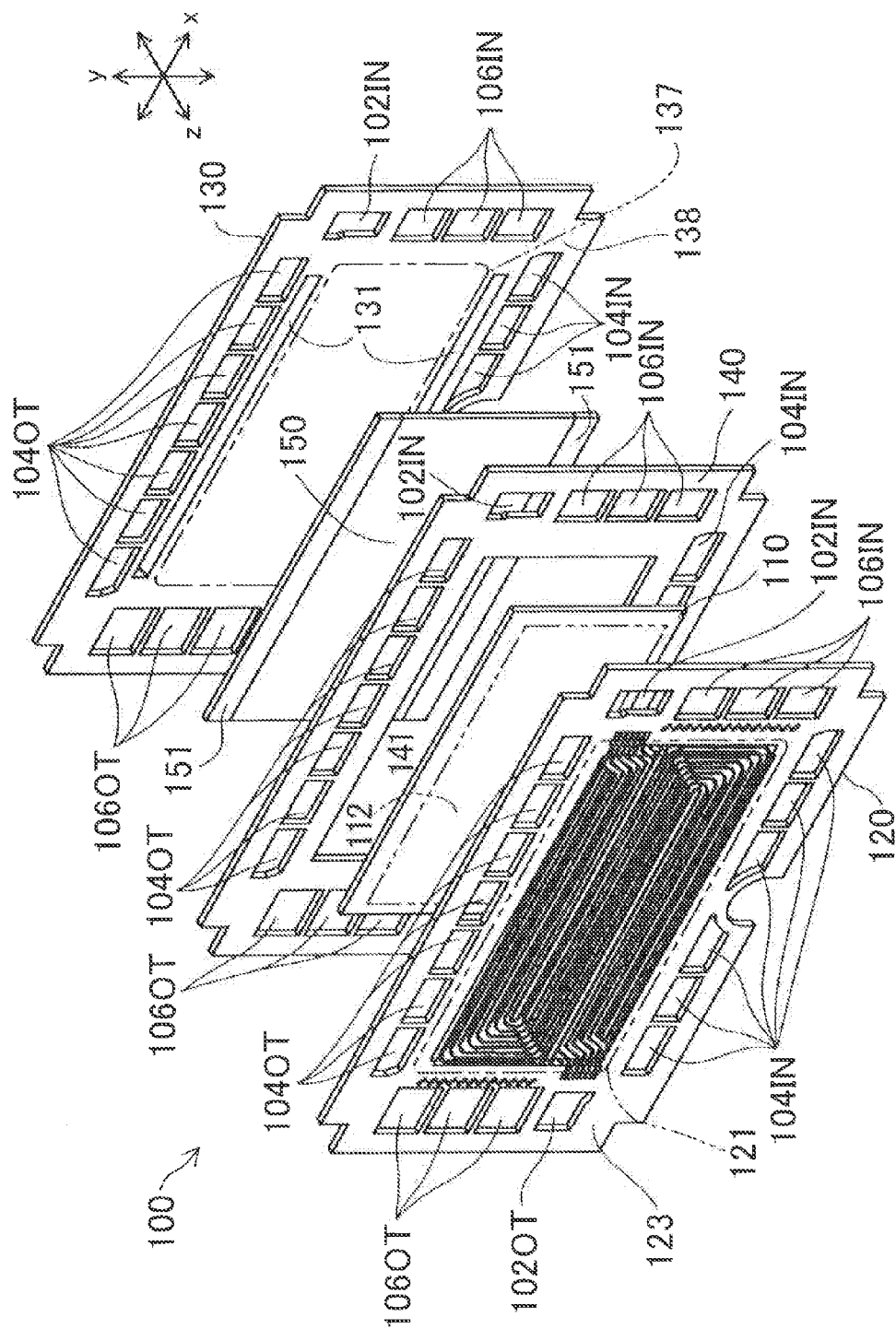
FIG. 3 is a schematic perspective view showing the configuration of the fuel cell 100 in an exploded manner.

FIG. 2 is an explanatory view schematically showing the state of arrangement of the terminal plate 160F, the fuel cell 100, and the terminal plate 160E, and FIG. 3 is a schematic perspective view showing the configuration of the fuel cell 100 in an exploded manner. As shown in FIG. 2, the fuel cell 100 includes an anode-side separator 120, a cathode-side separator 130, and an adhesive seal 140, and the adhesive seal 140 holds a membrane electrode & gas diffusion layer assembly (MEGA) 110 over a separator center region 101 shown in the drawing, and seals an outer peripheral edge of the MEGA 110. In the fuel cell 100, the adhesive seal 140 that holds the MEGA 110 is held between the anode-side separator 120 and the cathode-side separator 130 such that the MEGA 110 is held in the separator center region 101, and a space between the separators is sealed using the adhesive seal 140 in an outer edge portion 103 around the separator center region 101.

The MEGA 110 includes a membrane electrode assembly (MEA) in which paired catalyst electrode layers are respectively formed on both surfaces of an electrolyte membrane, and is a power generating element constituted by holding the MEA between gas diffusion layers (GDL) that diffuse and transmit the gas. Note that the MEGA is referred to as the MEA in some cases.

Each of the anode-side separator 120 and the cathode-side separator 130 is constituted by a member having a gas barrier property and electron conductivity, and is formed of, e.g., a carbon member such as dense carbon in which carbon particles are compressed and passage of the gas is thereby prevented, or a metal member such as press-molded stainless steel or titanium. In the present embodiment, the anode-side separator 120 is formed by performing press-molding on stainless steel.

The anode-side separator 120 includes a fuel gas passage in the shape of a plurality of grooves on the surface on the side of the MEGA 110 and a coolant passage in the shape of a plurality of grooves on the opposite surface, and the fuel gas passage and the coolant passage are arranged alternately on the front and back surfaces of the separator (the fuel gas passage on the surface on the side of the MEGA 110 and the coolant passage on the opposite surface are arranged alternately). These passages will be described later. The anode-side separator 120 includes a fuel gas supply hole 102IN and a fuel gas discharge hole 102OT, a plurality of oxidizing gas supply holes 104IN and a plurality of oxidizing gas discharge holes 104OT, and a plurality of coolant supply holes 106IN and a plurality of coolant discharge holes 106OT as the above-described supply/discharge holes constituting the manifolds. Similarly, the cathode-side separator 130 includes the fuel gas supply hole 102IN and the fuel gas discharge hole 102OT, a plurality of the oxidizing gas supply holes 104IN and a plurality of the oxidizing gas discharge holes 104OT, and a plurality of the coolant supply holes 106IN and a plurality of the coolant discharge holes 106OT. In addition, similarly, the adhesive seal 140 also includes the fuel gas supply hole 102IN and the fuel gas discharge hole 102OT, a plurality of the oxidizing gas supply holes 104IN and a plurality of the oxidizing gas discharge holes 104OT, and a plurality of the coolant supply holes 106IN and a plurality of the coolant discharge holes 106OT corresponding to the supply/discharge holes of the anode-side separator 120.

The adhesive seal 140 is formed of rubber having a sealing property, an insulating property, and elasticity such as, e.g., ethylene-propylene-diene rubber (EPDM), nitrile rubber (NBR), or fluoro rubber (FKM), and has a power generation region window 141 adapted to the rectangular shape of the MEGA 110. A stepped portion is provided at a peripheral edge of the power generation region window 141, and the MEGA 110 is fitted to the stepped portion. The MEGA 110 fitted in the power generation region window 141 overlaps with the adhesive seal 140 at the stepped portion of the adhesive seal 140, and a region exposed at the power generation region window 141 is used as a power generation region 112 that receives supply of the fuel gas from the anode-side separator 120 described later. The adhesive seal 140 includes the supply/discharge holes described above in the surrounding region around the power generation region window 141, and seals the anode-side separator 120 and the cathode-side separator 130 including regions around their supply/discharge holes in a state in which the MEGA 110 is fitted in the power generation region window 141. That is, the stepped portion of the adhesive seal 140 seals a region outside the power generation region 112 in the MEGA 110. The adhesive seal 140 also seals a rectangular outer peripheral region in the MEGA 110 while being interposed between the anode-side separator 120 and the cathode-side separator 130. FIG. 2 shows that the adhesive seal 140 itself has the rectangular shape, but actually, the adhesive seal 140 is formed into the shape shown in FIG. 2 after the above-described rubber material is disposed between the separators and thermal fusion and cooling are performed. Note that, as shown in FIG. 2, the anode-side and cathode-side separators 120 and 130 include fuel gas seal materials 300, oxidizing gas seal materials 301, and coolant seal materials 302 in order to secure the sealing property of the supply/discharge holes for the fuel gas, the oxidizing gas, and the coolant at the joint surface between the separators when the fuel cells 100 are stacked.

The cathode-side separator 130 includes a gas passage member 150, and the gas passage member 150 is joined to the MEGA 110 with the adhesive seal 140 interposed between the gas passage member 150 and the MEGA 110. The gas passage member 150 forms the passage of the oxidizing gas from the oxidizing gas supply holes 104IN to the oxidizing gas discharge holes 104OT, i.e., a cathode passage 152. Upper and lower ends of the gas passage member 150 are extended so as to overlap with upper ends of the oxidizing gas supply holes 104IN and lower ends of the oxidizing gas discharge holes 104OT. Accordingly, the gas passage member 150 introduces the oxidizing gas supplied from the oxidizing gas supply holes 104IN of the cathode-side separator 130 from the lower end, and diffuses and supplies the introduced oxidizing gas onto a cathode surface (XY plane) of the MEGA 110. The gas passage member 150 discharges the redundant oxidizing gas to the oxidizing gas discharge holes 104OT of the cathode-side separator 130 from the upper end. The gas passage member 150 is configured as an expanded metal formed by performing press-molding on a metal steel plate having conductivity, such as a stainless steel plate. In addition, the gas passage member 150 includes thin sealing sheets 151 that do not transmit the gas at the upper and lower ends in FIG. 2, and the sealing sheets 151 are joined to upper and lower end regions of the MEGA 110.

Figure 4:
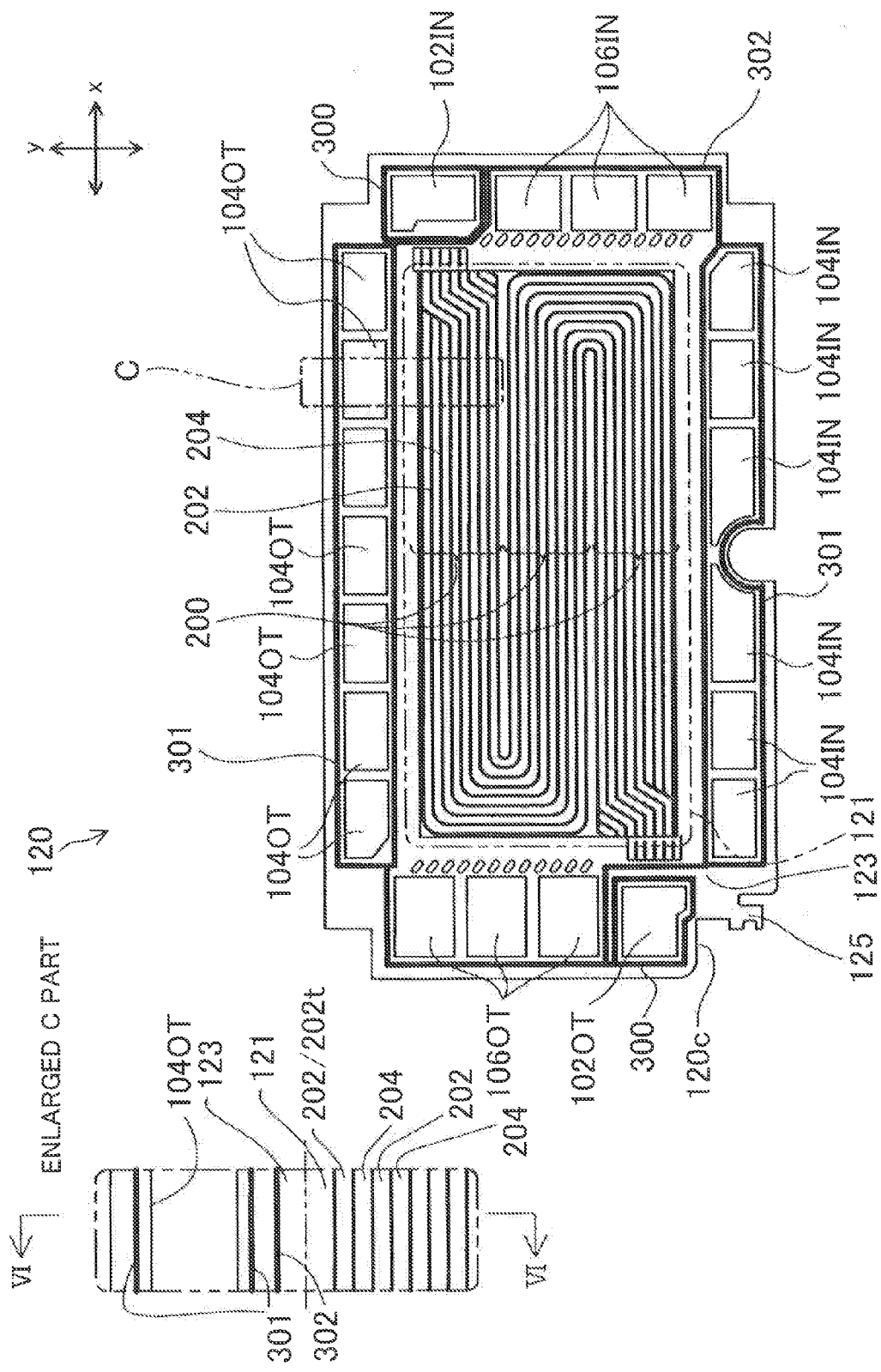
FIG. 4 is a schematic plan view showing the configuration of an anode-side separator 120.
Figure 5:
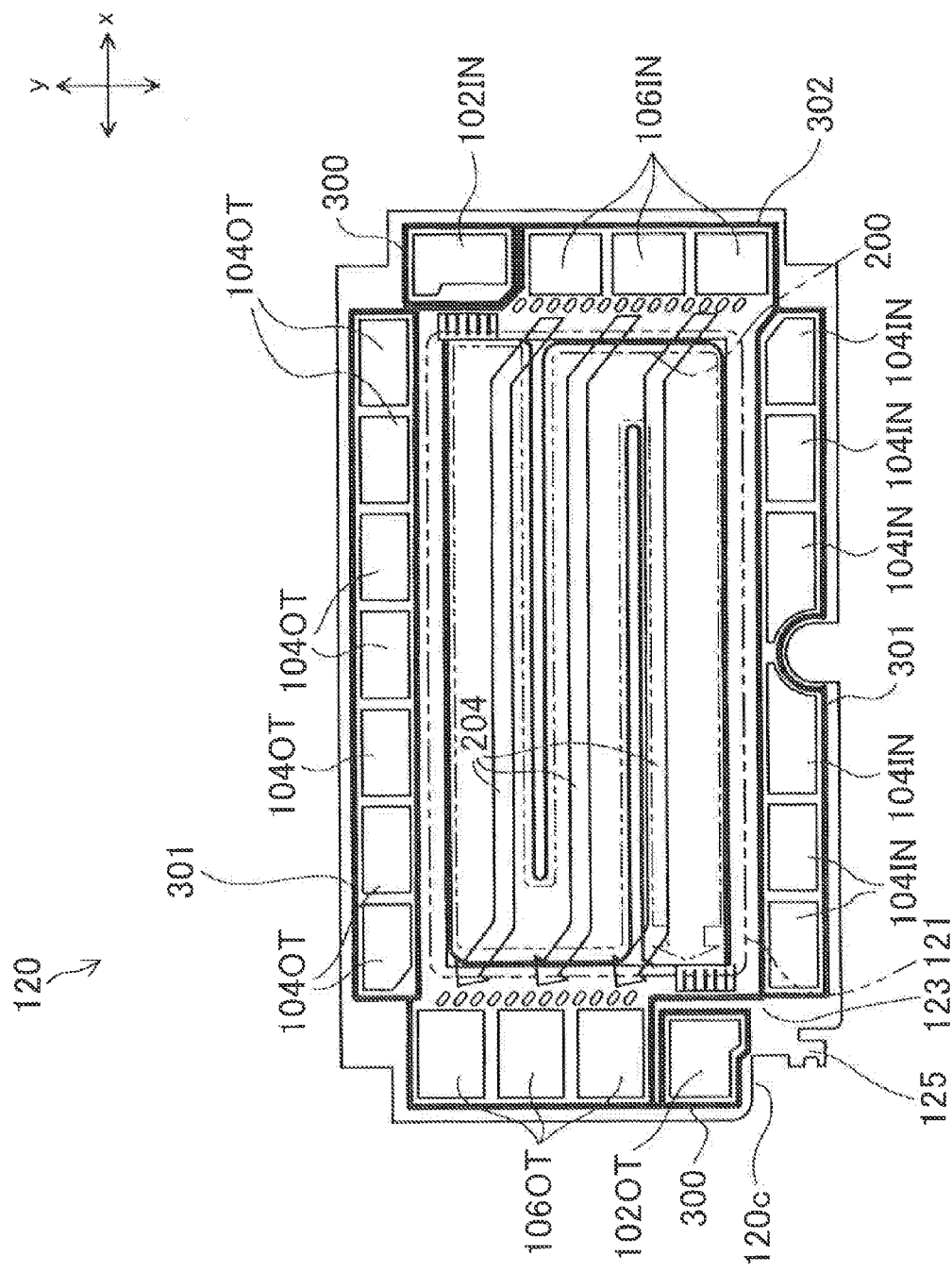
FIG. 5 is an explanatory view in which a fuel gas passage 200 and a coolant passage 204 formed on the front and the back of the anode-side separator 120 are superimposed on each other and shown.

FIG. 4 is a schematic plan view showing the configuration of the anode-side separator 120, and FIG. 5 is an explanatory view in which a fuel gas passage 200 and a coolant passage 204 formed on the front surface and the back surface of the anode-side separator 120 are superimposed on each other and shown. Each of FIGS. 4 and 5 shows the state viewed from the side of a surface (hereinafter also referred to as a "cooling surface") facing another fuel cell 100 adjacent to the anode-side separator 120. A surface that is the back surface of the cooling surface, i.e., a surface facing the MEGA 110 is referred to as a "gas surface". The anode-side separator 120 is formed by performing press-molding on stainless steel or the like and, as shown in FIG. 2, holds the MEGA 110 between the anode-side separator 120 and the cathode-side separator 130 having the gas passage member 150 with the adhesive seal 140 interposed between the anode-side separator 120 and the cathode-side separator 130. The anode-side separator 120 includes a plurality of first grooves 202 and a plurality of second grooves 204 that are arranged alternately in a separator center region 121 facing the above-described power generation region 112 of the MEGA 110, and includes the fuel gas supply hole 102IN and the fuel gas discharge hole 102OT, a plurality of the oxidizing gas supply holes 104IN and a plurality of the oxidizing gas discharge holes 104OT, and a plurality of the coolant supply holes 106IN and a plurality of the coolant discharge holes 106OT as the supply/discharge holes for the reactive gas and the coolant described above in an outer edge portion 123 that extends outward from the separator center region 121 and surrounds the separator center region 121. Among these supply/discharge holes, the fuel gas supply hole 102IN and the fuel gas discharge hole 102OT are individually sealed by the fuel gas seal materials 300, and a row of the plurality of the oxidizing gas supply holes 104IN and a row of the plurality of the oxidizing gas discharge holes 104OT are sealed by the respective oxidizing gas seal materials 301. The coolant seal material 302 surrounds a coolant circulation region that includes the plurality of the coolant supply holes 106IN and the plurality of the coolant discharge holes 106OT, and the separator center region 121 on the cooling surface-side, and seals the coolant circulation region. In the cathode-side separator 130 as well, the supply/discharge holes are sealed in a similar manner.

Each first groove 202 is a recessed groove that is opened on the side of the above-described gas surface of the anode-side separator 120, in other words, on the side of the surface on a far side of a paper sheet in FIG. 4, i.e., on the side of the MEGA 110, and extends on the gas surface. Each second groove 204 is a recessed groove that is opened on the side of the above-described cooling surface of the anode-side separator 120, in other words, on the side of the surface on a near side of the paper sheet in FIG. 4, and extends on the cooling surface. The first grooves 202 and the second grooves 204 are formed by press molding in which an uneven mold adapted to the shapes of the grooves is pressed to the separator center region 121. Thus, the first grooves 202 and the second grooves 204 are formed as a plurality of uneven stripes. In the separator center region 121, the first grooves 202 and the second grooves 204 are arranged alternately on the front surface and the back surface of the anode-side separator 120. That is, in a longitudinal sectional view in FIG. 6, the anode-side separator 120 is formed to have an uneven sectional shape (corrugated sectional shape) in which the first grooves 202 and the second grooves 204 are arranged alternately and repeatedly.

Each first groove 202 that is depressed on the side of the gas surface forms a fuel gas passage groove (hereinafter also referred to as a "fuel gas passage groove 202") that supplies the fuel gas to the MEGA 110 exposed at the power generation region window 141 of the adhesive seal 140. Each second groove 204 that is depressed on the side of the cooling surface constitutes a rib that separates the fuel gas passage grooves 202, and also constitutes a coolant passage groove (hereinafter also referred to as a "coolant passage 204") through which the coolant passes when the anode-side separator 120 is in contact with the cathode-side separator 130 described later. The fuel gas passage 200 is constituted by a plurality of the fuel gas passage grooves 202, and the fuel gas passage 200 and the coolant passage 204 are formed on the front and back surfaces of the anode-side separator 120. The fuel gas passage 200 extends from the fuel gas supply hole 102IN to the fuel gas discharge hole 102OT while folding. The fuel gas passage 200 is formed on the side of the above-described gas surface on the far side of the paper sheet in each of FIGS. 4 and 5 as a serpentine passage in which the flow direction of the gas is reversed a plurality of times. In the fuel cell 100 of the present embodiment, in the fuel gas passage 200 serving as the serpentine passage, the fuel gas passage grooves 202 positioned on the sides of the upper and lower ends of the separator center region 121 shown in FIG. 4 extend in a right and left direction of the separator center region 121 i.e., in the X direction in FIG. 4, on the side of the outer edge portion 123. With this configuration, in the case where the separator center region 121 faces the power generation region 112 of the MEGA 110, it is possible to supply the fuel gas to the peripheral edge of the power generation region 112 from the fuel gas passage grooves 202 that extend in the right and left direction of the separator center region 121 on the side of the outer edge portion 123. Note that, as shown in an enlarged C part in FIG. 4, the first groove 202 that is positioned on the side of each of the upper and lower ends of the separator center region 121 and extends in the right and left direction of the separator center region 121 on the side of the outer edge portion 123 is referred to as an end portion first groove 202t in order to distinguish the first groove 202 described above from the first groove 202 that is positioned inside the separator center region 121.

Since the fuel gas passage 200 is formed as the serpentine passage, in each of horizontal end-side regions (hereinafter referred to as passage horizontal end regions) in the right and the left sides of the separator center region 121 shown in FIG. 4, the direction of the passage is changed from the X direction to the Y direction or, inversely from the Y direction to the X direction. Each fuel gas passage groove 202 constituting the fuel gas passage 200 functions as the rib that separates the coolant passages 204 on the side of the cooling surface in a straight passage region extending in the X direction that includes the above-described passage horizontal end regions. The fuel gas passage grooves 202 do not inhibit the flow of the coolant in the second grooves 204 that flows to the coolant discharge holes 106OT. However, in the passage horizontal end region in which the direction of the passage is changed, the fuel gas passage grooves 202 act as walls, and there is a possibility that the flow of the coolant flowing from the coolant supply holes 106IN to the coolant discharge holes 106OT may be inhibited. To cope with this, portions each having a shallow depth are provided along the passage in each fuel gas passage groove 202 in the passage horizontal end region, and thus, the flow of the coolant between the adjacent second grooves 204 is allowed. With this configuration, the flow of the coolant is no longer inhibited in the horizontal end-side regions in the left and the right sides of the separator center region 121. Thus, a plurality of the coolant passages 204 are formed on the back surface of the fuel gas passage 200 serving as the serpentine passage (in other words, the plurality of the coolant passages 204 are formed on a surface opposite to the fuel gas passage 200), and the coolant flows from the coolant supply holes 106IN to the coolant discharge holes 106OT along the coolant passages 204.

In addition, the anode-side separator 120 includes a cutting portion 120c and a connector mounting portion 125 at the outer edge portion 123 in a separator corner portion on the side of the fuel gas discharge hole 102OT. The cutting portion 120c serves as a mounting portion in which a cell monitor connector is mounted, and is used for potential measurement of each fuel cell 100.

As shown in FIG. 3, the cathode-side separator 130 is formed into a substantially flat shape. In the cathode-side separator 130, legs 131 protrude to the far side of the paper sheet in FIG. 3 in the vicinity of upper and lower ends of a separator center region 137 facing the above-described power generation region 112 of the MEGA 110, i.e., in the vicinity of the upper and lower ends of the gas passage member 150. Each leg 131 comes into contact with the outer edge portion 123 of the anode-side separator 120 of the adjacent fuel cell 100 described later when the fuel cells 100 are stacked. The state of the contact will be described later. The cathode-side separator 130 includes, as the supply/discharge holes for the reactive gas and the coolant described above, the fuel gas supply hole 102IN and the fuel gas discharge hole 102OT, a plurality of the oxidizing gas supply holes 104IN and a plurality of the oxidizing gas discharge holes 104OT, and a plurality of the coolant supply holes 106IN and a plurality of the coolant discharge holes 106OT in an outer edge portion 138 that extends outward from the separator center region 137 and surrounds the separator center region 137.

Figure 6:
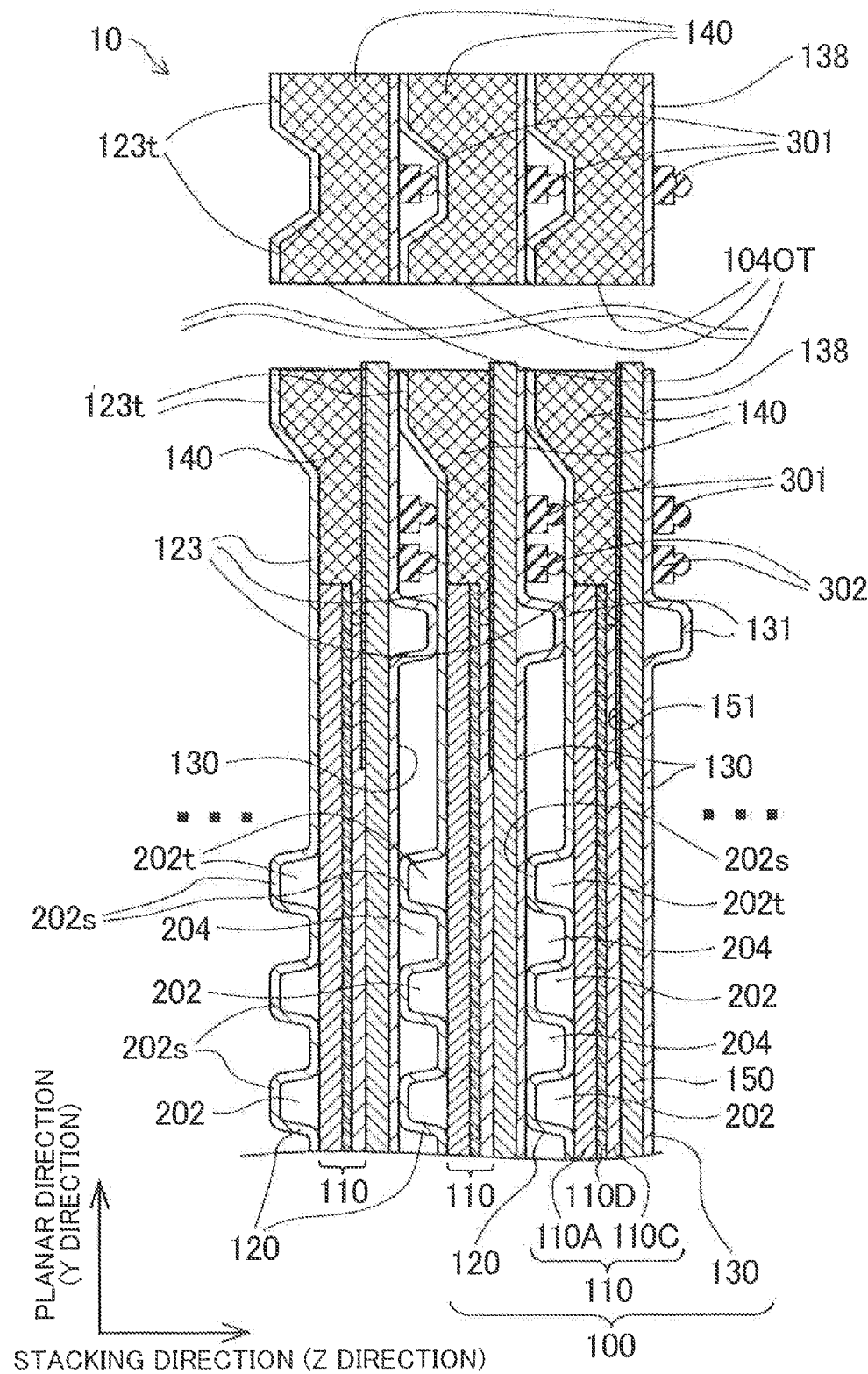
FIG. 6 shows the schematic section of the fuel battery 10 taken along the line VI-VI in an enlarged C part in FIG. 4.

Next, a description will be given of the state of the stack of the fuel cells 100 in the fuel battery 10. FIG. 6 shows the schematic section of the fuel battery 10 taken along the line VI-VI in the enlarged C part in FIG. 4. As shown in the drawing, the fuel battery 10 is constituted by stacking a plurality of the fuel cells 100. In the fuel cell 100, the MEGA 110 is held between the anode-side separator 120 and the cathode-side separator 130. Note that, in FIG. 6, the MEGA 110 is shown in a state in which an MEA 110D in which the catalyst electrode layers are respectively joined to both membrane surfaces of the electrolyte membrane is held between an anode-side gas diffusion layer 110A and a cathode-side gas diffusion layer 110C. In each fuel cell 100, the outer edge portion 123 (see FIGS. 3 and 4) that extends outward from the separator center region 121 in the anode-side separator 120 is joined to the MEGA 110 at the peripheral edge of the power generation region 112 (see FIGS. 3 and 4) of the MEGA 110. In addition, in each fuel cell 100, the separator center region 121 provided with the first grooves 202 and the second grooves 204 is caused to face and come into contact with the power generation region 112 of the MEGA 110. With this configuration, opening ends of the first groove 202t of the end portion and the first grooves 202, of the other portions are closed by the MEGA 110, and the first groove 202t and the first grooves 202 function as the fuel gas passage grooves 202. In the cathode-side separator 130, the separator center region 137 (see FIG. 3) is caused to face the power generation region 112 of the MEGA 110 with the gas passage member 150 interposed therebetween.

In addition, in each fuel cell 100, the outer edge portion 123 of the anode-side separator 120 and the outer edge portion 138 of the cathode-side separator 130 are caused to face each other via the adhesive seal 140 that functions as the seal on the side of the outer peripheral edge of the MEGA 110. As shown in FIG. 6, the outer edge portion 123 of the anode-side separator 120 includes protruding portions 123t that protrude outwardly of the cell on the side of the oxidizing gas discharge holes 104OT, and the adhesive seal 140 seals a portion between the outer edge portion 138 of the cathode-side separator 130, and the outer edge portion 123 and the protruding portions 123t without any gap.

In the stacked fuel cells 100 positioned adjacent to each other, a bottom wall 202s of each first groove 202 of the anode-side separator 120 of one of the fuel cells 100 is brought into contact with the cathode-side separator 130 of the other fuel cell 100. With this configuration, the opening end of the second groove 204 is closed, and the second groove 204 functions as the coolant passage 204. In addition, in the stacked fuel cells 100 positioned adjacent to each other, each leg 131 of the cathode-side separator 130 of one of the fuel cells 100 is brought into contact with the outer edge portion 123 of the anode-side separator 120 of the other fuel cell 100. With this configuration, the leg 131 functions as a support for each fuel cell 100 at the outer edge portion 123 of the anode-side separator 120. In the stacked fuel cells 100 positioned adjacent to each other, each protruding portion 123t at the outer edge portion 123 of the anode-side separator 120 of one of the fuel cells 100 is brought into contact with the outer edge portion 138 of the cathode-side separator 130 of the other fuel cell 100. With this configuration, a recessed portion between the protruding portions 123t is formed outside the oxidizing gas discharge hole 104OT, and the oxidizing gas seal material 301 is disposed in the recessed portion.

In the stacked fuel cells 100 positioned adjacent to each other, the coolant seal material 302 (see FIG. 4) and the oxidizing gas seal material 301 that surrounds the oxidizing gas discharge holes 104OT are held between the anode-side separator 120 of one of the fuel cells 100 and the cathode-side separator 130 of the other fuel cell 100 on the upper end-side of the separators. The coolant seal material 302 surrounds the coolant circulation region that includes the fuel gas supply hole 102IN, the separator center region 121 on the side of the cooling surface as the side on which the coolant passage 204 is opened, and the fuel gas discharge hole 102OT. Note that, the coolant seal material 302 and the oxidizing gas seal material 301 that surrounds the oxidizing gas supply holes 104IN are held between the anode-side separator 120 of one of the fuel cells 100 and the cathode-side separator 130 of the other fuel cell 100 on the lower end-side of the separators. In addition, at right and left ends of the separators, the coolant seal material 302, the fuel gas seal material 300 that surrounds the fuel gas supply hole 102IN, and the fuel gas seal material 300 that surrounds the fuel gas discharge hole 102OT are held between the anode-side separator 120 of one of the fuel cells 100 and the cathode-side separator 130 of the other fuel cell 100.

Thus, the fuel battery 10 in which the fuel cells 100 are stacked is fastened in the cell stacking direction using a plurality of fastening bolts that are not shown. In the fuel battery 10 having the fastened stack structure, the anode-side separator 120 of one of the stacked fuel cells 100 positioned adjacent to each other comes into contact with the cathode-side separator 130 of the other fuel cell 100.

Figure 7:
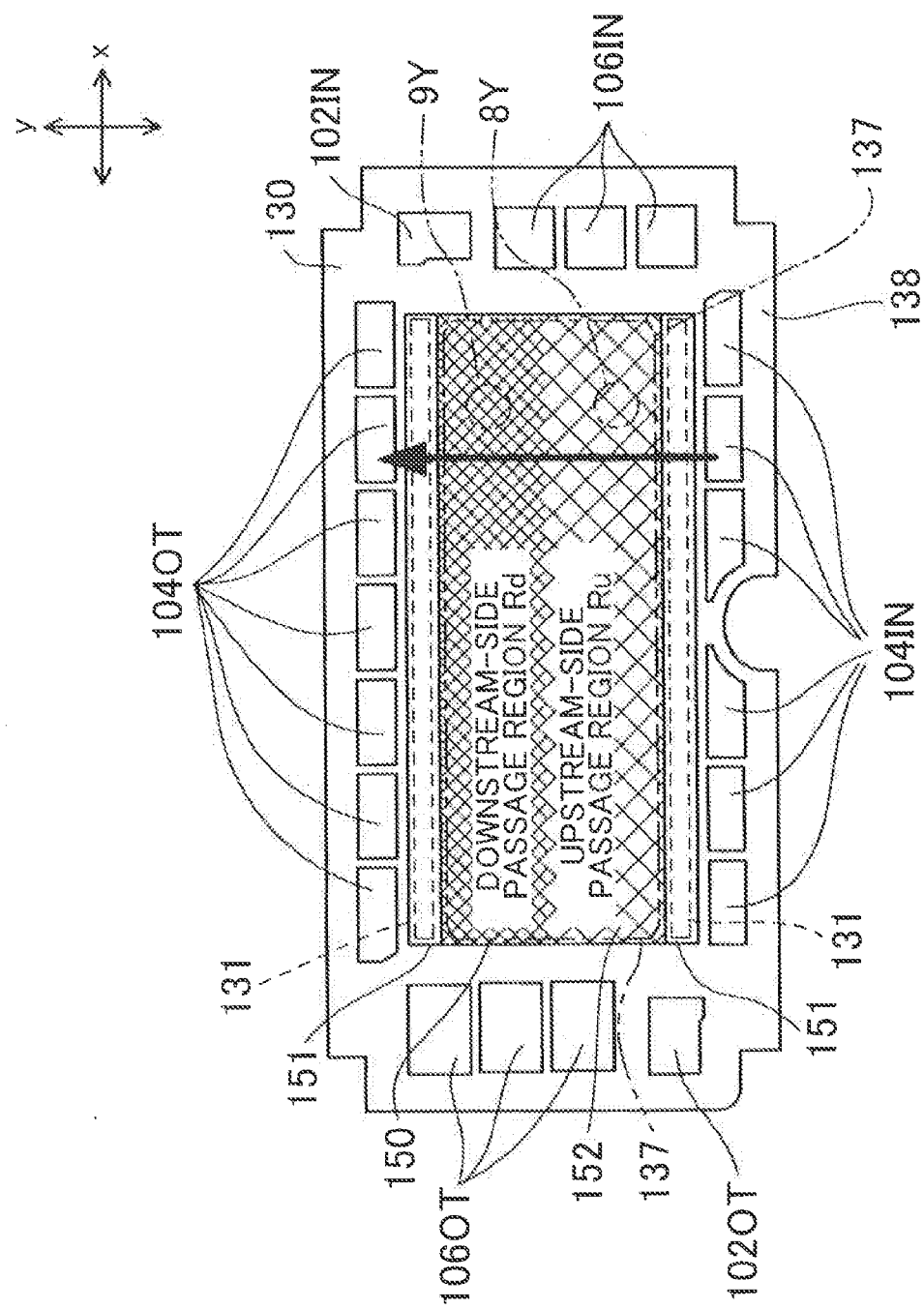
FIG. 7 is an explanatory view schematically showing the state of partial regions of a passage region in a gas passage member 150 when a cathode-side separator 130 is viewed in a plan view.
Figure 8:
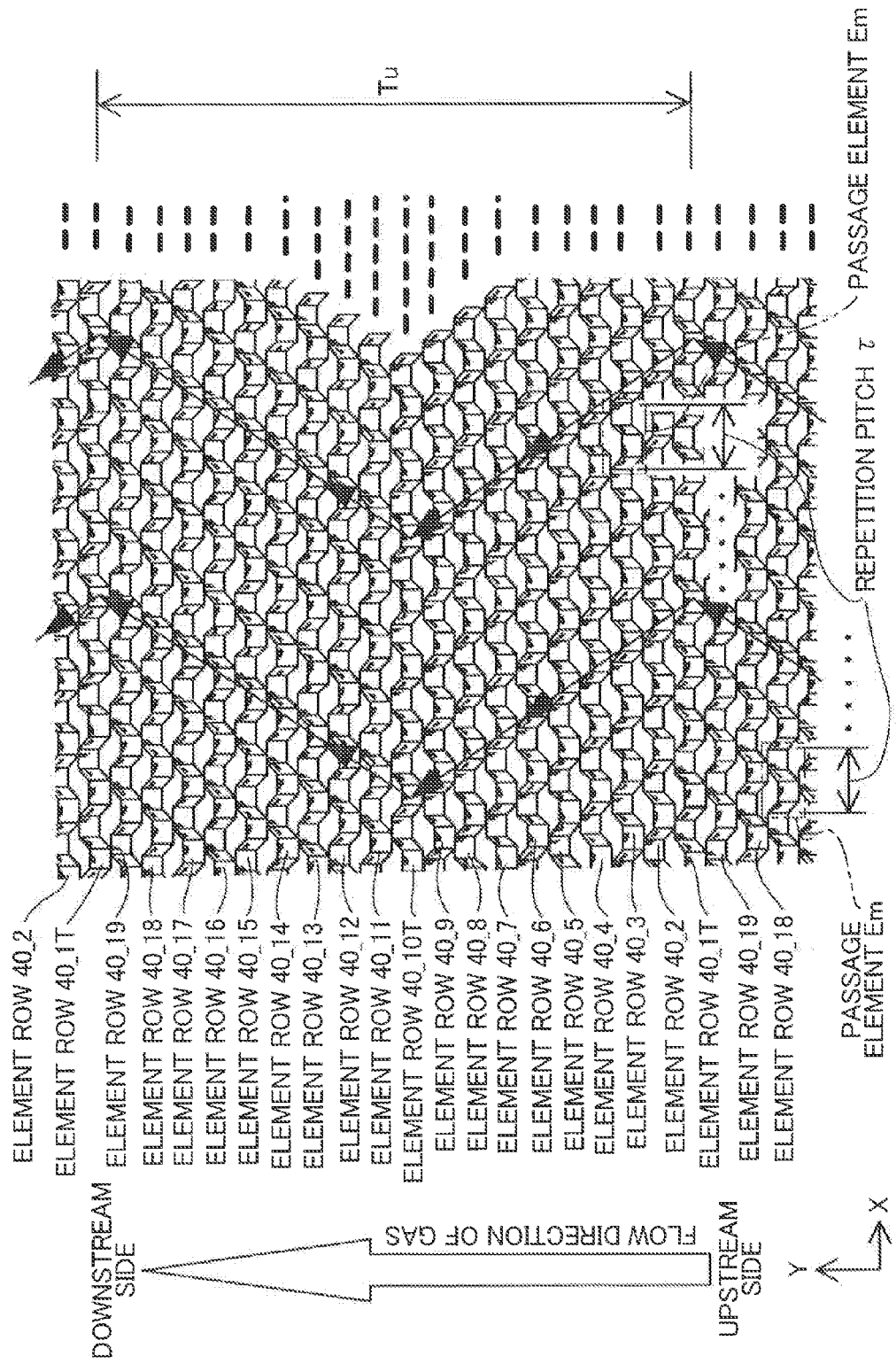
FIG. 8 is an explanatory view schematically showing a passage configuration when a part of an upstream-side passage region Ru is viewed from a gas upstream side on a side of oxidizing gas supply holes 104IN.
Figure 9:
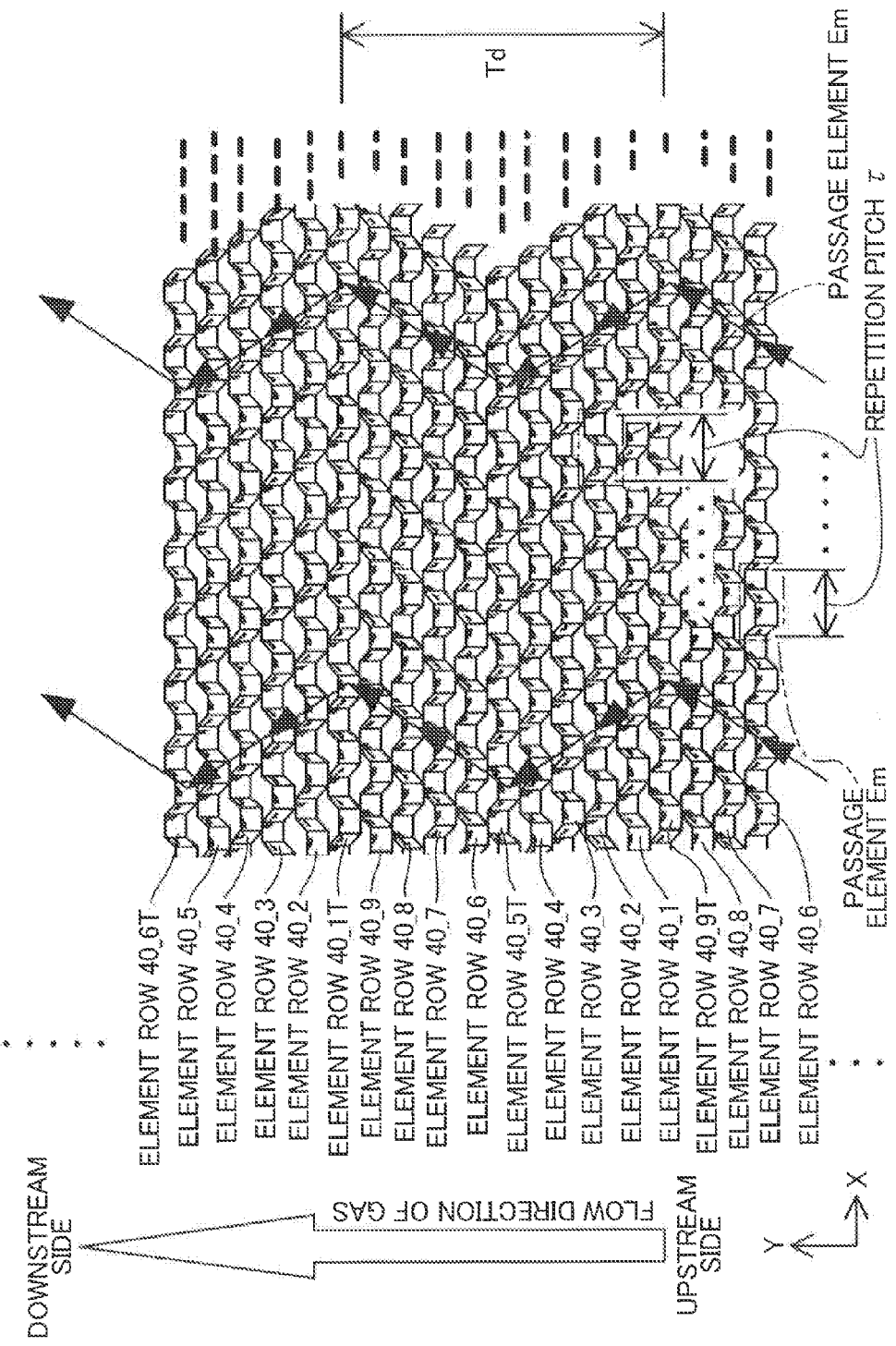
FIG. 9 is an explanatory view schematically showing a passage configuration when a part of a downstream-side passage region Rd is viewed from the gas upstream side on the side of the oxidizing gas supply holes 104IN.

Next, a description will be given of the configuration of the gas passage member 150 in the cathode-side separator 130. FIG. 7 is an explanatory view schematically showing partial regions of a passage region in the gas passage member 150 when the cathode-side separator 130 is viewed in a plan view, FIG. 8 is an explanatory view schematically showing a passage configuration when a part of an upstream-side passage region Ru is viewed from a gas upstream side on the side of the oxidizing gas supply holes 104IN, and FIG. 9 is an explanatory view schematically showing a passage configuration when a part of a downstream-side passage region Rd is viewed from the gas upstream side on the side of the oxidizing gas supply holes 104IN.

As shown in FIG. 7, the gas passage member 150 divides the separator center region 137 of the cathode-side separator 130 into the upstream-side passage region Ru on the side of the oxidizing gas supply holes 104IN and the downstream-side passage region Rd on the side of the oxidizing gas discharge holes 104OT. In each passage region, the oxidizing gas is diffused and supplied to the cathode-side gas diffusion layer 110C (see FIG. 6) of the MEGA 110 using a mesh-shaped passage. In the gas passage member 150, an expanded passage serving as the mesh-shaped passage is formed by using an expanded metal formed by press molding. As shown in FIGS. 8 and 9, the gas passage member 150 is constituted by a plurality of passage forming element rows 40. In each passage forming element row 40, passage elements Em that form the mesh-shaped passage are consecutively provided along a second direction (X direction) that intersects with a first direction (Y direction) extending from the oxidizing gas supply holes 104IN to the oxidizing gas discharge holes 104OT. More specifically, the passage element Em is constituted by a recessed portion and a protruding portion that are connected to each other in the X direction, and the passage forming element row 40 is constituted by repeatedly providing the passage elements Em along the X direction consecutively. In FIGS. 8 and 9, the passage forming element rows 40 are indicated by indexes 1 to 19 (n), and the index T denotes a turn row of the passage described later. The passage forming element rows 40 form the mesh-shaped expanded passage over the separator center region 137 and regions under the sealing sheets 151 above and below the separator center region 137. In addition, in the gas passage member 150, the plurality of the passage forming element rows 40 are consecutively provided from the oxidizing gas supply holes 104IN to the oxidizing gas discharge holes 104OT along the Y direction orthogonal to the X direction, i.e., the Y direction as the flow direction of the gas (air) shown as an up and down direction in the drawing. Note that, in the mesh-shaped passage formed by the passage elements Em, a formation wall forming each of the recessed portion and the protruding portion has a predetermined inclination with respect to the XY plane, and the formation walls are consecutively provided.

In the passage forming element row 40, the passage elements Em are consecutively arranged at a repetition pitch τ in a +X direction or −X direction. The number of the passage forming element rows 40 along the Y direction, i.e., the number of rows indicated by the index of the passage forming element row 40 in the upstream-side passage region Ru is different from that in the downstream-side passage region Rd in the following manner. In the upstream-side passage region Ru, 19 passage forming element rows 40 indicated by the indexes 1 to 19 are set as a Y-direction consecutive provision unit, and thus, the passage forming element rows 40 are repeatedly provided in the Y direction consecutively. On the other hand, in the downstream-side passage region Rd, 9 passage forming element rows 40 indicated by the indexes 1 to 9 are set as the Y-direction consecutive provision unit, and thus, the passage forming element rows 40 are repeatedly provided in the Y direction consecutively. In each of the upstream-side passage region Ru and the downstream-side passage region Rd, the passage forming element rows 40 are provided such that the flow direction of the oxidizing gas extends (in other words, the flow direction of the oxidizing gas is directed) in a first inclination direction in which the flow direction of the oxidizing gas is inclined to the left (in the drawing) and a second inclination direction in which the flow direction of the oxidizing gas is inclined to the right (in the drawing). Herein, the first inclination direction and the second inclination direction are symmetrical with respect to the Y direction. That is, in the fuel battery 10 of the present embodiment, in the gas passage member 150 of the cathode-side separator 130, a turn interval at which the flow direction of the oxidizing gas returns to the original flow direction (the first inclination direction or the second inclination direction) after turning to the left (i.e., extending in the first inclination direction) and turning to the right (i.e., extending in the second inclination direction symmetrical with the first inclination direction with respect to the Y direction) in the upstream-side passage region Ru is made different from the turn interval in the downstream-side passage region Rd by making the number of rows that define the Y-direction consecutive provision unit in the upstream-side passage region Ru different from the number of rows that define the Y-direction consecutive provision unit in the downstream-side passage region Rd.

In the fuel cell 100 of the present embodiment, since the thickness of an existing expansion press blade (expansion processing blade) is approximately 0.6 mm, a turn interval Tu in the upstream-side passage region Ru is set to 11 mm, and a turn interval Td in the downstream-side passage region Rd is set to 5.5 mm. Therefore, the ratio Tu:Td between the turn interval Tu and the turn interval Td is 2.1:1. The ratio Tu:Td can be appropriately set by changing the number of rows "n" that define the above-described Y-direction consecutive provision unit between the upstream-side passage region Ru and the downstream-side passage region Rd, and the ratio Tu:Td is required to be 1.1:1 to 3:1. This point will be described later. Note that, in each of the upstream-side passage region Ru and the downstream-side passage region Rd, as shown in FIG. 6, even in the region covered with the sealing sheet 151, the passage forming element rows 40 are consecutively provided in the Y direction. A press molding method for consecutively forming the passage forming element rows 40 in the gas passage member 150 is not different from an existing expanded metal production method, and pressing may be performed while returning a cutting blade (not shown) at the repetition pitch τ in the −X direction after sending the cutting blade at the repetition pitch τ in the +X direction.

Figure 10:
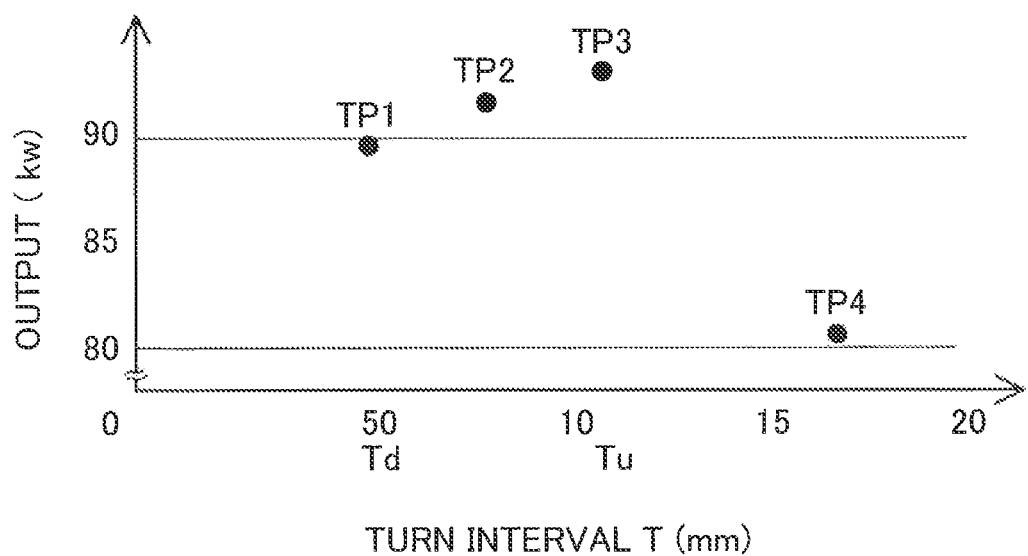
FIG. 10 is a graph showing a relationship between a turn interval and an output of the fuel cell.

Next, a description will be given of the ratio between the upstream-side passage region Ru and the downstream-side passage region Rd. FIG. 10 is a graph showing a relationship between the turn interval T and the output of the fuel cell. The graph in FIG. 10 was determined in the following manner.

A test fuel cell used in output measurement has the same specifications including the shape and the power generation region 112 as those of the fuel cell 100 of the present embodiment shown in FIG. 2, and the passage forming element rows 40 are consecutively provided at the same turn interval T in the Y direction over the entire region in the gas passage member 150. The turn intervals T of test fuel cells TP1, TP2, TP3, and TP4 are different from each other. The turn interval T of the test fuel cell TP1 is 5.5 mm. The turn interval T of the test fuel cell TP1 is the same as the turn interval Td of the downstream-side passage region Rd in the fuel cell 100 of the present embodiment. The turn interval T of the test fuel cell TP2 is 7.7 mm. The turn interval T of the test fuel cell TP2 is substantially the intermediate value between the turn interval Td of the downstream-side passage region Rd and the turn interval Tu of the upstream-side passage region Ru in the fuel cell 100 of the present embodiment. The turn interval T of the test fuel cell TP3 is 11 mm. The turn interval T of the test fuel cell TP3 is the same as the turn interval Tu of the upstream-side passage region Ru in the fuel cell 100 of the present embodiment. The turn interval T of the test fuel cell TP4 is 16.5 mm that is three times the turn interval Td. The above-described test fuel cells TP1 to TP4 were operated while the gas was supplied in the same manner, electric power outputs when the temperature of the fuel cell was at a normally expected temperature (60° C.) were determined, and the graph in FIG. 10 was obtained. From this graph, it can be seen that it is possible to obtain preferable power generation performance by reducing the turn interval T to a value smaller than 16.5 mm and setting the turn interval T to a value equal to or larger than 5.5 mm. Based on these, in the fuel cell 100 of the present embodiment, the ratio between the turn interval Tu of the upstream-side passage region Ru and the turn interval Td of the downstream-side passage region Rd is set to 1.1:1 to 3:1.

Figure 11:
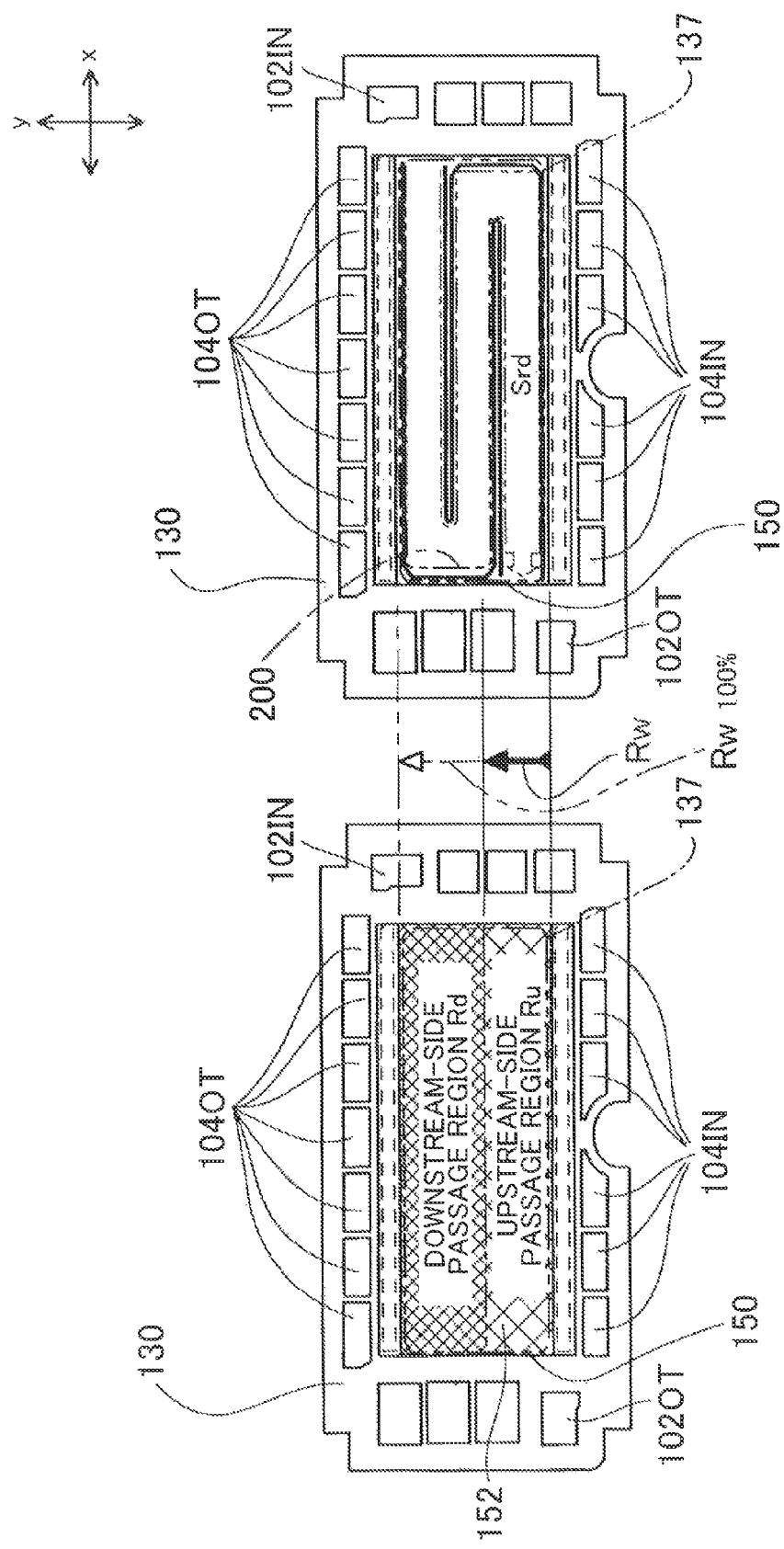
FIG. 11 is an explanatory view showing the state of occupancy of the upstream-side passage region Ru in a separator center region 137 and the state of overlap between the upstream-side passage region Ru and the fuel gas passage 200.

Next, a description will be given of a passage width Rw of the upstream-side passage region Ru in the separator center region 137. FIG. 11 is an explanatory view showing the state of occupancy of the upstream-side passage region Ru in the separator center region 137 and the state of overlap between the upstream-side passage region Ru and the fuel gas passage 200. As shown in FIG. 11, the upstream-side passage region Ru extends in the Y direction from the side of the oxidizing gas supply holes 104IN to the side of the oxidizing gas discharge holes 104OT in the separator center region 137 that faces the power generation region 112 (see FIG. 3). In addition, the upstream-side passage region Ru overlaps with a most downstream-side passage portion Srd in the fuel gas passage 200 serving as the serpentine passage of the anode-side separator 120 (see FIG. 3) with the MEGA 110 interposed between the upstream-side passage region Ru and the most downstream-side passage portion Srd. Note that, in FIG. 11, on the assumption that the anode-side separator 120 is positioned above the cathode-side separator 130 shown in the drawing, the fuel gas passage 200 is shown transparently.

Figure 12:
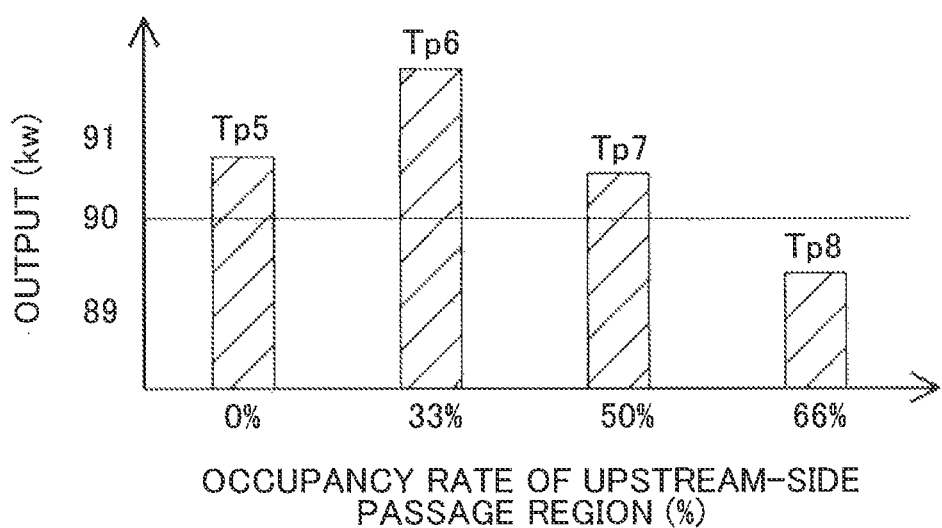
FIG. 12 is a graph showing a relationship between an occupancy rate of the upstream-side passage region Ru in the separator center region 137 of the gas passage member 150 and the output of the fuel cell.

FIG. 12 is a graph showing a relationship between an occupancy rate of the upstream-side passage region Ru in the separator center region 137 of the gas passage member 150 and the output of the fuel cell. The graph in FIG. 12 was determined in the following manner.

First, as shown in FIG. 1, test fuel cells TP5 to TP8 having different passage widths Rw of the upstream-side passage regions Ru in the Y direction were prepared. The passage width Rw is the width from the lower end of the separator center region 137 on the side of the oxidizing gas supply holes 104IN to the upper end of the upstream-side passage region Ru. The specifications of each of the test fuel cells TP5 to TP8 are the same as those of the fuel cell 100 of the present embodiment shown in FIG. 2, as described above. However, the test fuel cell TP5 does not include the upstream-side passage region Ru having the turn interval Tu shown in FIG. 8, and the entire region of the separator center region 137 is occupied by the downstream-side passage region Rd having the turn interval Td in FIG. 9. In the test fuel cell TP6, 33% of the separator center region 137 is occupied by the upstream-side passage region Ru having the turn interval Tu. In the test fuel cell TP7, 50% of the separator center region 137 is occupied by the upstream-side passage region Ru having the turn interval Tu. In the test fuel cell TP8, 66% of the separator center region 137 is occupied by the upstream-side passage region Ru having the turn interval Tu. The above-described test fuel cells TP5 to TP8 were operated while the gas was supplied in the same manner, the electric power outputs when the temperature of the fuel cell was at the normally expected temperature (60° C.) were determined, and the graph in FIG. 12 was obtained. From this graph, it can be seen that it is possible to obtain preferable power generation performance by setting the passage width Rw of the upstream-side passage region Ru to 50% or less of the width of the separator center region 137 of the gas passage member 150 in the Y direction in the cathode-side separator 130, i.e., the entire passage width of the expanded passage of the cathode-side separator 130. Based on these, in the fuel cell 100 of the present embodiment, the passage width Rw of the upstream-side passage region Ru is set to 50% or less of the entre passage width of the expanded passage of the cathode-side separator 130. In the case of FIG. 12, each of the test fuel cell TP6 and the test fuel cell TP7 corresponds to the fuel cell 100 of the present embodiment.

As shown in FIG. 11, the passage width of the fuel gas passage 200 serving as the serpentine passage is divided into three equal widths by the reversal (folding) of the passage from the fuel gas supply hole 102IN to the fuel gas discharge hole 102OT, and in the Y direction of the separator center region 137, an upstream-side passage portion, a midstream-side passage portion, and the most downstream-side passage portion Srd have the three equal widths described above. In the test fuel cell TP6, 33% of the separator center region 137 is occupied by the upstream-side passage region Ru having the turn interval Tu. Accordingly, the passage width Rw of the upstream-side passage region Ru in the test fuel cell TP6 becomes equal to the passage width of the most downstream-side passage portion Srd of the fuel gas passage 200 serving as the serpentine passage, the upstream-side passage region Ru overlaps with the most downstream-side passage portion Srd with the MEGA 110 interposed therebetween, and as shown in FIG. 12, the test fuel cell TP6 has a high power generation ability.

Figure 13:
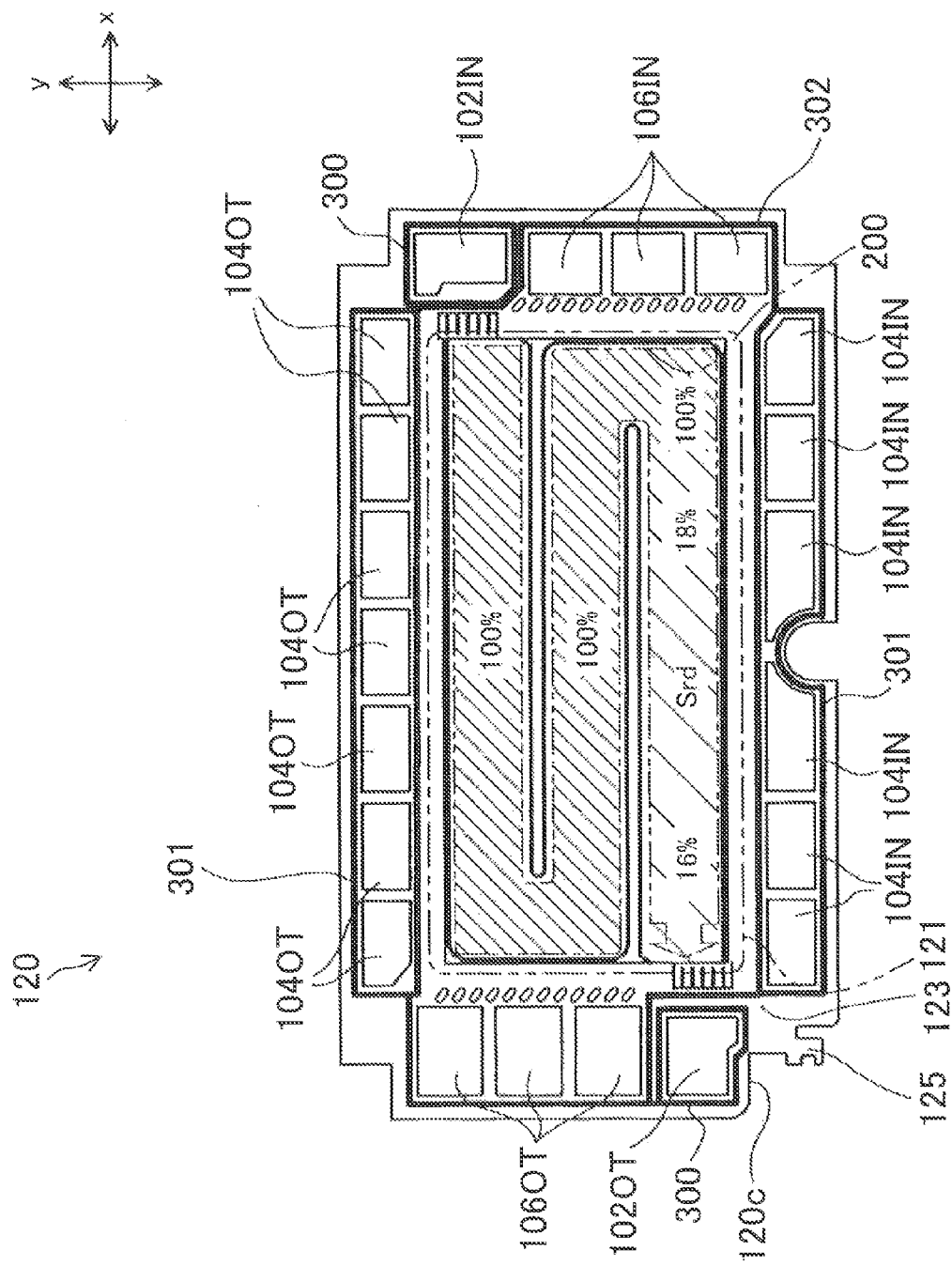
FIG. 13 is an explanatory view showing an actual measurement result of a relative humidity of each passage region of the fuel gas passage 200 in a test fuel cell TP5.
Figure 14A:
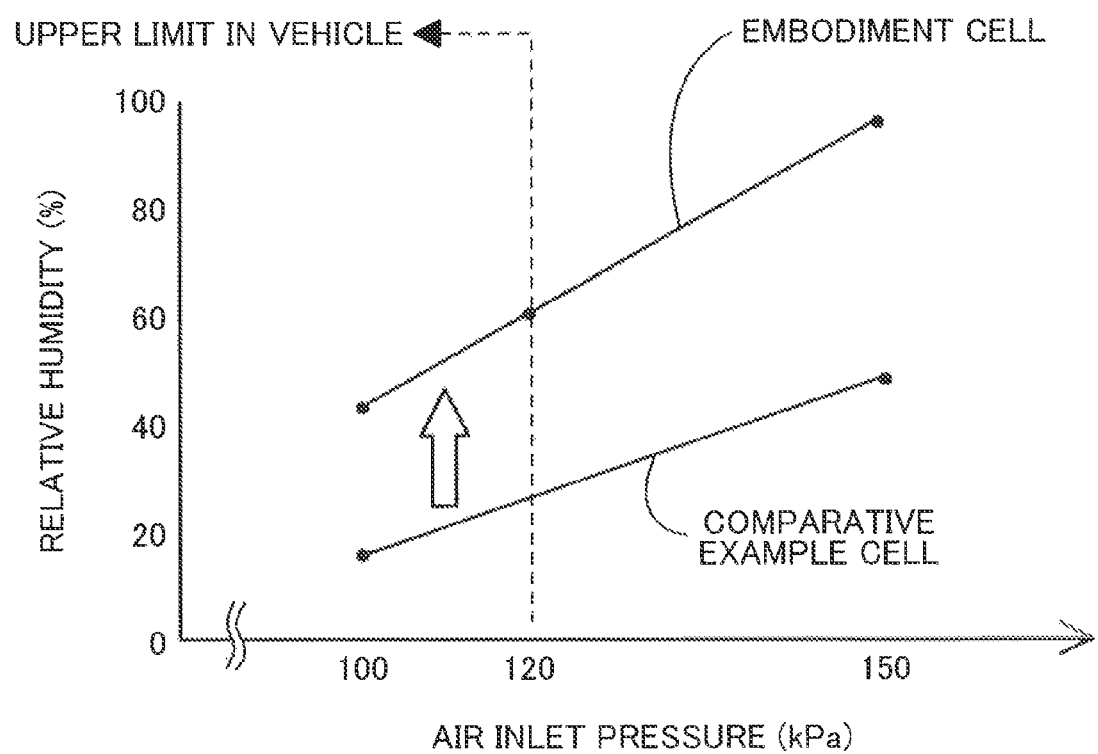
FIGS. 14A and 14B are explanatory views each showing a performance comparison between the test fuel cell TP5 and a test fuel cell TP6 corresponding to the fuel cell 100 of the present embodiment.
Figure 14B:
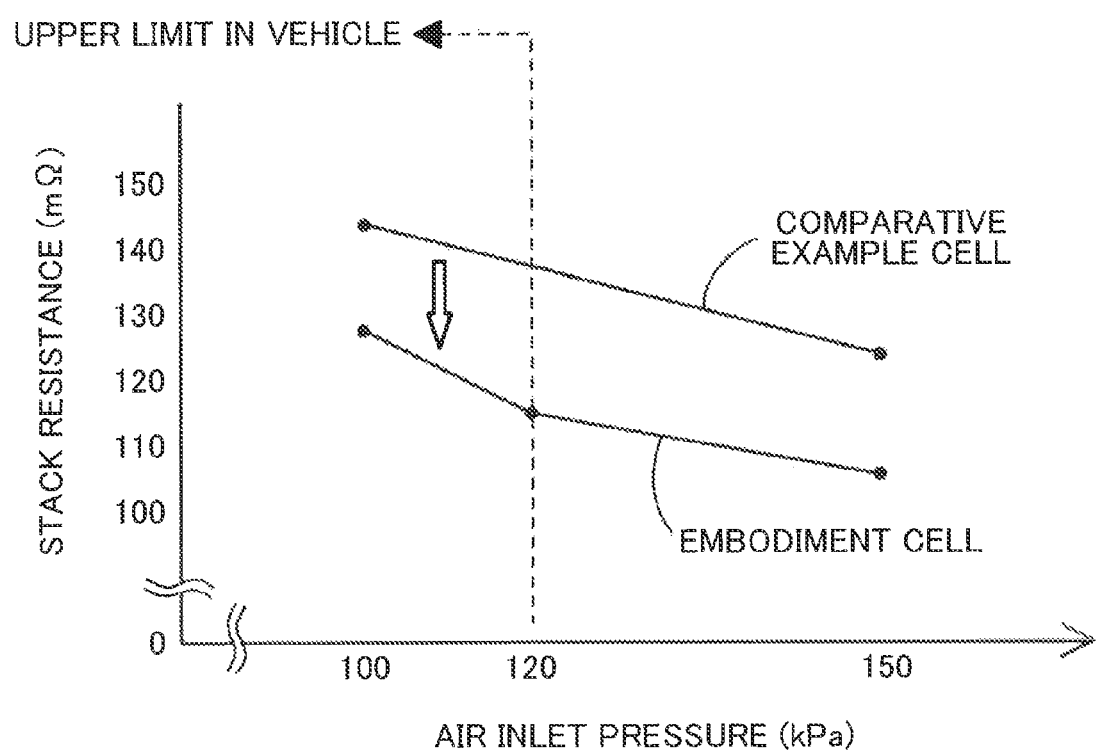

Next, a description will be given of the relative humidity of the passage along the fuel gas passage 200. When the relative humidity of the fuel gas passage 200 is low, the movement of generated water from the MEGA 110 (see FIG. 6) may occur, and humidity of the electrolyte membrane may be deteriorated. Consequently, it is preferable that each passage region of the fuel gas passage 200 should have a high relative humidity. FIG. 13 is an explanatory view showing an actual measurement result of the relative humidity of each passage region of the fuel gas passage 200 in the test fuel cell TP5, and FIGS. 14A and 14B are explanatory views each showing a performance comparison between the test fuel cell TP5 and the test fuel cell TP6 corresponding to the fuel cell 100 of the present embodiment. The test fuel cell TP5 is a comparative example cell, and as described above, does not include the upstream-side passage region Ru having the turn interval Tu (see FIG. 8), and hence an improvement in relative humidity resulting from including the upstream-side passage region Ru cannot occur. In contrast to this, in the test fuel cell TP6, 33% of the passage width of the separator center region 137 is occupied by the upstream-side passage region Ru such that the upstream-side passage region Ru having the turn interval Tu (see FIG. 8) overlaps with the most downstream-side passage portion Srd of the fuel gas passage 200 with the MEGA 110 interposed therebetween. Based on these, in the test fuel cell TP6 corresponding to the fuel cell 100 of the present embodiment, it is possible to obtain the effect of the improvement in relative humidity by including the upstream-side passage region Ru. FIG. 14A shows the relative humidity in each of the fuel cells TP5 and TP6. In the test fuel cell TP6 corresponding to the fuel cell 100 of the present embodiment, as compared with the comparative example cell, the relative humidity at the terminal end of the most downstream-side passage portion Srd of the fuel gas passage 200 shown in FIG. 13 was improved from 16% to 43%. In addition, it was found that the improvement in relative humidity is further promoted when the supply pressure of the oxidizing gas from the oxidizing gas supply holes 104IN is increased.

In addition to this, as shown in FIG. 14B, in the test fuel cell TP6 corresponding to the fuel cell 100 of the present embodiment, due to the above-described improvement in relative humidity as one factor, stack resistance was reduced as compared with the test fuel cell TP5 as the comparative example cell, and an improvement in power generation performance was obtained.

Figure 15:
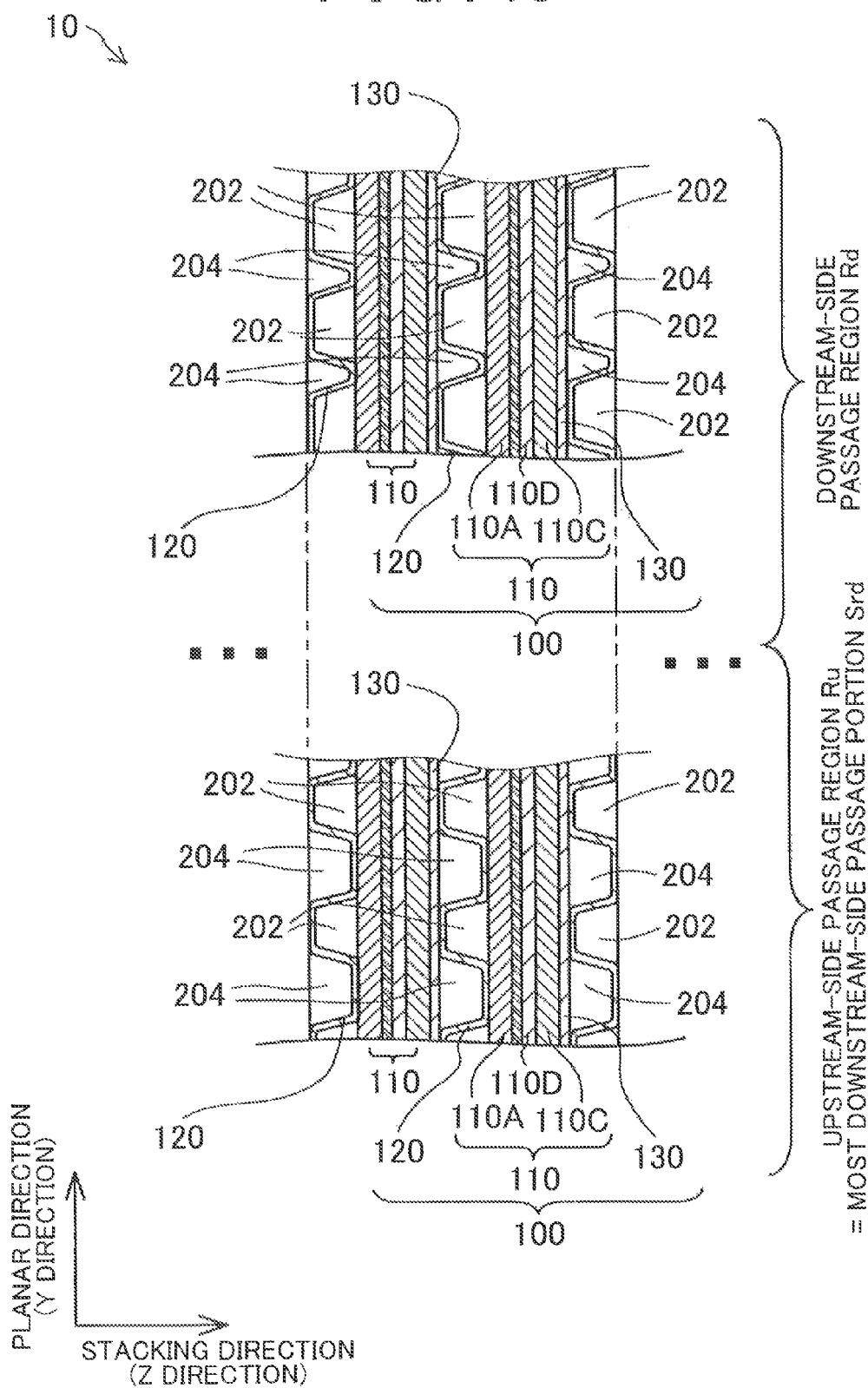
FIG. 15 is an explanatory view in which the schematic section of the upstream-side passage region Ru and the schematic section of the downstream-side passage region Rd in the case where the fuel battery 10 is viewed in a sectional view as in the case of FIG. 6 are compared with each other.

Next, a description will be given of the configuration of the coolant passage in the upstream-side passage region Ru and the downstream-side passage region Rd. FIG. 15 is an explanatory view in which the schematic section of the upstream-side passage region Ru and the schematic section of the downstream-side passage region Rd in the case where the fuel battery 10 is viewed in a sectional view as in the case of FIG. 6 are compared with each other.

As shown in the drawing, in the fuel cell 100, it is assumed that the passage shapes of the fuel gas passage grooves 202 that are opened on the side of the anode-side gas diffusion layer 110A are identical with each other in the upstream-side passage region Ru and the downstream-side passage region Rd. On the other hand, with regard to the coolant passages 204 closed by the cathode-side separator 130, the coolant passage 204 included in the upstream-side passage region Ru has the passage width larger than that of the coolant passage 204 included in the downstream-side passage region Rd. In the fuel cell 100, the upstream-side passage region Ru provided with the coolant passage 204 having the larger passage width is overlapped with the most downstream-side passage portion Srd of the fuel gas passage 200, as described above. Accordingly, in the fuel cell 100, as shown in FIG. 15, the flow rate of the coolant flowing in the coolant passage 204 that extends from the coolant supply hole 106IN to the coolant discharge hole 106OT via the back side of the most downstream-side passage portion Srd of the fuel gas passage 200 serving as the serpentine passage is increased to be larger than the flow rate of the coolant flowing in the coolant passage 204 that extends from the coolant supply hole 106IN to the coolant discharge hole 106OT via the back side of a portion upstream of the most downstream-side passage portion Srd in the fuel gas passage 200 serving as the serpentine passage, and the effect of cooling the most downstream-side passage portion Srd is thereby enhanced.

As described thus far, in the fuel cell 100 of the present embodiment, in the gas passage member 150 of the cathode-side separator 130, the cathode passage 152 for the oxidizing gas extending from the oxidizing gas supply holes 104IN to the oxidizing gas discharge holes 104OT is formed as the expanded passage (FIG. 8, FIG. 9), and the turn interval T at which the flow direction of the oxidizing gas returns to the original direction in the upstream-side passage region Ru on the side of the oxidizing gas supply holes 104IN and the turn interval T in the downstream-side passage region Rd on the side of the oxidizing gas discharge holes 104OT are set such that the turn interval Tu in the upstream-side passage region Ru is larger than the turn interval Td in the downstream-side passage region Rd. With this configuration, in the upstream-side passage region Ru as the oxidizing gas supply side, it is possible to reduce the number of turn positions at which the flow direction of the oxidizing gas changes to suppress the pressure loss of the gas. Further, in the fuel cell 100 of the present embodiment, by setting the ratio Tu:Td between the turn interval Tu in the upstream-side passage region Ru and the turn interval Td in the downstream-side passage region Rd to 1.1:1 to 3:1 based on the performance comparison obtained in FIG. 10, the number of the turn positions in the upstream-side passage region Ru is not excessively reduced as compared with the number of the turn positions in the downstream-side passage region Rd or the number of the turn positions in the downstream-side passage region Rd is not excessively increased as compared with the number of the turn positions in the upstream-side passage region Ru, and the turn positions are provided in the upstream-side passage region Ru and the downstream-side passage region Rd in a well-balanced manner. With this configuration, it is possible to suppress the penetration of water into the MEGA 110 that tends to occur in the downstream-side passage region Rd in which many turn positions are provided. As a result, in the fuel cell 100 of the present embodiment, it is possible to suppress the pressure loss of the oxidizing gas in the upstream-side passage region Ru as the oxidizing gas supply side, and to suppress flooding.

In addition to this, in the fuel cell 100 of the present embodiment, the relative humidity of the most downstream-side passage portion Srd of the fuel gas passage 200 serving as the serpentine passage formed by the anode-side separator 120 is increased in the following manner. The most downstream-side passage portion Srd of the fuel gas passage 200 serving as the serpentine passage is overlapped with the upstream-side passage region Ru of the gas passage member 150 with the MEGA. 110 interposed therebetween, and hence the relative humidity tends to be reduced in the most downstream-side passage portion Srd due to removal of water by the oxidizing gas or the supply of the dry oxidizing gas (see FIG. 13). However, in the fuel cell 100 of the present embodiment, evaporation of water from the MEGA 110 is suppressed by reducing the number of the turn positions in the upstream-side passage region Ru (see FIG. 8), and hence it is possible to send water contained in the MEGA 110 to the most downstream-side passage portion Srd of the fuel gas passage 200. Based on these, in the fuel cell 100 of the present embodiment, as shown in FIG. 14A, it is possible to increase the relative humidity of the most downstream-side passage portion Srd of the fuel gas passage 200 serving as the serpentine passage.

In the fuel cell 100 of the present embodiment, the passage width Rw of the upstream-side passage region Ru along the Y direction extending from the oxidizing gas supply holes 104IN to the oxidizing gas discharge holes 104OT is made equal to the passage width of the most downstream-side passage portion Srd of the fuel gas passage 200 serving as the serpentine passage (FIG. 11, FIG. 12: see the test fuel cell TP6). Therefore, in the fuel cell 100 of the present embodiment, by causing the upstream-side passage region Ru capable of suppressing the evaporation of water to overlap with the most downstream-side passage portion Srd having the same passage width, it is possible to increase the relative humidity of the most downstream-side passage portion Srd more reliably.

In the fuel cell 100 of the present embodiment, the passage width Rw of the upstream-side passage region Ru along the Y direction extending from the oxidizing gas supply holes 104IN to the oxidizing gas discharge holes 104OT is set to 50% or less of the entire passage width of the gas passage member 150 along the Y direction (FIG. 11, FIG. 12: see the test fuel cells TP6 to TP7). With this configuration, in the fuel cell 100 of the present embodiment, it is possible to secure the upstream-side passage region Ru in which the number of the turn positions is reduced such that the evaporation of water from the MEGA 110 is suppressed and the water from the MEGA 110 can be sent to the most downstream-side passage portion Srd of the fuel gas passage 200. Thus, it is possible to even more reliably increase the relative humidity of the most downstream-side passage portion Srd of the fuel gas passage 200 in the shape of the serpentine passage.

In the fuel cell 100 of the present embodiment, the effect of cooling the most downstream-side passage portion Srd by the coolant is enhanced by making the passage width of the coolant passage 204 in the most downstream-side passage portion Srd of the fuel gas passage 200 serving as the serpentine passage larger than the passage width of the coolant passage 204 in a portion upstream of the most downstream-side passage portion Srd in the fuel gas passage 200 (see FIG. 15). Therefore, in the fuel cell 100 of the present embodiment, it is possible to suppress the evaporation of water by efficiently cooling the most downstream-side passage portion Srd of the fuel gas passage 200 that tends to be dried due to a reduction in relative humidity, and thus, it is possible to suppress dryness.

The invention is not limited to the embodiment described above, and the invention can be implemented in various configurations without departing from the scope of the invention. For example, the technical features in the embodiment can be appropriately replaced or combined in order to solve a part or all of the above-described problems or achieve a part or all of the above effects. In addition, any of the technical features, if not explained as essential in the present specification, may be deleted as appropriate.

In the fuel cell 100 of the present embodiment, the number of the passage forming element rows 40 defining the turn interval Tu in the upstream-side passage region Ru is set to 19, and the number of the passage forming element rows 40 defining the turn interval Td in the downstream-side passage region Rd is set to 9, but the passage forming element rows 40 may be consecutively provided in the Y direction such that the numbers of the passage forming element rows 40 in the upstream-side passage region Ru and the in the downstream-side passage region Rd are numbers other than the above-described numbers. In addition, it is also possible to set the numbers of the passage forming element rows 40 in the upstream-side passage region Ru and the in downstream-side passage region Rd to even numbers.

In the fuel cell 100 of the present embodiment, the upstream-side passage region Ru along the Y direction extending from the oxidizing gas supply holes 104IN to the oxidizing gas discharge holes 104OT is overlapped with the most downstream-side passage portion Srd of the fuel gas passage 200 with the MEGA 110 interposed therebetween, and the passage width Rw of the upstream-side passage region Ru is set to 50% or less of the entire passage width of the gas passage member 150 along the Y direction. Even in the configuration in which the passage width Rw of the upstream-side passage region Ru having the large turn interval T as shown in FIG. 8 is set to 50% or less of the entire passage width of the gas passage member 150 along the Y direction, it is possible to achieve the effect obtained by setting the turn interval T of the upstream-side passage region Ru to the large turn interval.

Note that the invention can be implemented in various forms. For example, the invention can be implemented as a fuel battery stack or a fuel battery in which a plurality of the fuel cells are stacked, and as a method of manufacturing the fuel cell.

What is claimed is:

1. A fuel cell comprising:
    a membrane electrode assembly including an electrolyte membrane and electrodes joined to membrane surfaces of the electrolyte membrane;
    an anode-side passage formation portion having a fuel gas supply hole and a fuel gas discharge hole and forming an anode passage that supplies a fuel gas to one of the electrodes of the membrane electrode assembly, as a serpentine passage in which a flow direction of the fuel gas is reversed a plurality of times, the anode passage extending from the fuel gas supply hole to the fuel gas discharge hole; and
    a cathode-side passage formation portion having an oxidizing gas supply hole and an oxidizing gas discharge hole and forming a cathode passage that diffuses an oxidizing gas and supplies the oxidizing gas to another electrode of the membrane electrode assembly, as a mesh-shaped passage, the cathode passage extending from the oxidizing gas supply hole to the oxidizing gas discharge hole, wherein:
    the cathode-side passage formation portion includes a plurality of passage forming element rows that are consecutively provided from the oxidizing gas supply hole to the oxidizing gas discharge hole along a first direction extending from the oxidizing gas supply hole to the oxidizing gas discharge hole;
    each of the passage forming element rows is formed by consecutively providing a plurality of passage forming elements along a second direction intersecting with the first direction;
    the plurality of passage forming element rows are consecutively provided such that a flow direction of the oxidizing gas flowing in the cathode passage serving as the mesh-shaped passage extends in a first inclination direction and a second inclination direction in every predetermined number of the passage forming element rows, the predetermined number being an integer of 2 or more;
    the first inclination direction is inclined to one side relative to the first direction, the second inclination direction is inclined to another side relative to the first direction, and the first inclination direction and the second inclination direction are symmetrical with respect to the first direction;
    a turn interval at which the flow direction of the oxidizing gas returns to an original direction in an upstream-side passage region on a side of the oxidizing gas supply hole is made different from the turn interval in a downstream-side passage region on a side of the oxidizing gas discharge hole by making the predetermined number in the upstream-side passage region different from the predetermined number in the downstream-side passage region;
    a ratio between the turn interval in the upstream-side passage region and the turn interval in the downstream-side passage region is set to 1.1:1 to 3:1; and
    the upstream-side passage region is overlapped with a most downstream-side passage portion of the anode passage serving as the serpentine passage formed by the anode-side passage formation portion with the membrane electrode assembly interposed between the upstream-side passage region and the most downstream-side passage portion.

2. The fuel cell according to claim 1, wherein a passage width of the upstream-side passage region along the first direction is equal to a passage width of the most downstream-side passage portion of the anode passage serving as the serpentine passage.

3. The fuel cell according to claim 1, wherein a passage width of the upstream-side passage region along the first direction is set to 50% or less of an entire passage width of the cathode passage along the first direction.

4. The fuel cell according to claim 1, wherein:
    the anode passage is formed on one of surfaces of the anode-side passage formation portion as the serpentine passage, the anode passage being formed by a groove that is opened on a side of the one of the electrodes;
    the anode-side passage formation portion has a coolant supply hole and a coolant discharge hole, and includes a plurality of coolant passages in which a coolant flows from the coolant supply hole to the coolant discharge hole, the plurality of coolant passages being formed on a surface opposite to the anode passage; and
    the plurality of coolant passages are formed such that a flow rate of the coolant flowing in the coolant passage that extends from the coolant supply hole to the coolant discharge hole via a back side of the most downstream-side passage portion of the anode passage serving as the serpentine passage is larger than a flow rate of the coolant flowing in the coolant passage that extends from the coolant supply hole to the coolant discharge hole via a back side of a portion upstream of the most downstream-side passage portion in the anode passage serving as the serpentine passage.

\* \* \* \* \*